United States Patent
Shimokawa

(10) Patent No.: US 11,386,332 B2
(45) Date of Patent: Jul. 12, 2022

(54) OPTIMIZATION CALCULATION METHOD AND INFORMATION PROCESSING APPARATUS

(71) Applicant: FUJITSU LIMITED, Kawasaki (JP)

(72) Inventor: Satoshi Shimokawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 351 days.

(21) Appl. No.: 16/661,265

(22) Filed: Oct. 23, 2019

(65) Prior Publication Data

US 2020/0210853 A1 Jul. 2, 2020

(30) Foreign Application Priority Data

Dec. 26, 2018 (JP) .............................. JP2018-243292

(51) Int. Cl.
*G06Q 10/00* (2012.01)
*G06F 17/18* (2006.01)
(Continued)

(52) U.S. Cl.
CPC ........... *G06N 3/126* (2013.01); *G06K 9/6231* (2013.01); *G06N 3/086* (2013.01)

(58) Field of Classification Search
CPC ...... G06N 3/126; G06N 3/086; G06K 9/6231; G06F 2111/06; G06F 30/20
(Continued)

(56) References Cited

U.S. PATENT DOCUMENTS

| 2003/0145289 | A1  | 7/2003 | Anderson |
| 2008/0120129 | A1* | 5/2008 | Seubert .................. G06Q 10/10 |
|              |     |        | 705/35 |

(Continued)

FOREIGN PATENT DOCUMENTS

| JP | 11-85720    | 3/1999 |
| JP | 2003-248810 | 9/2003 |
| JP | 2014-160399 | 9/2014 |

OTHER PUBLICATIONS

J. Cale et al, "El Core Inductor Designs using Population-Based Design Algorithms", *Applied Power Electronics Conference*, Feb. 2007, pp. 1062-1069.

Hamida et al, "ASCHEA: New Results Using Adaptive Segregational Constraint Handling", *Proceedings of the 2002 Congress on Evolutionary Computation*, May 12-17, 2002, vol. 1, pp. 884-889.

(Continued)

*Primary Examiner* — Brandon S Cole

(74) *Attorney, Agent, or Firm* — Staas & Halsey LLP

(57) ABSTRACT

An optimization calculation method includes: generating, by a computer, current generation individuals with a selected previous generation individual as a parent individual; evaluating each current generation individual by using a predetermined evaluation function; calculating a current generation constraint condition value based on a previous generation constraint condition value and a constraint condition provisional value which is achieved by more than half of the current generation individuals; determining whether a result of the evaluation for each current generation individual satisfies the current generation constraint condition value; determining a predetermined offset based on an attribute of each individual, which is generated by a mutation generating process, among individuals having the evaluation results satisfying the current generation constraint condition value; and adding the predetermined offset to a random number used to generate each next generation individual by the mutation generating process.

12 Claims, 22 Drawing Sheets

(51) Int. Cl.
  *G06F 12/08*   (2016.01)
  *G06N 3/12*    (2006.01)
  *G06K 9/62*    (2022.01)
  *G06N 3/08*    (2006.01)

(58) Field of Classification Search
  USPC ........................................................ 706/1–62
  See application file for complete search history.

(56) References Cited

U.S. PATENT DOCUMENTS

| | | | | |
|---|---|---|---|---|
| 2012/0196261 | A1* | 8/2012 | Kim ........................ | G09B 7/02 |
| | | | | 434/322 |
| 2012/0254842 | A1* | 10/2012 | Henderson ................ | G06F 8/76 |
| | | | | 717/136 |
| 2013/0272386 | A1* | 10/2013 | Yu ........................ | H04N 19/147 |
| | | | | 375/240.03 |
| 2016/0171153 | A1* | 6/2016 | Van Rooyen .......... | G16B 40/00 |
| | | | | 702/20 |
| 2016/0306922 | A1* | 10/2016 | van Rooyen ........... | H04L 67/10 |
| 2016/0306923 | A1* | 10/2016 | van Rooyen ........... | G06N 3/002 |
| 2017/0249744 | A1* | 8/2017 | Wang ....................... | G06T 7/11 |
| 2019/0265976 | A1* | 8/2019 | Goryavskiy ........ | G06F 9/30058 |

OTHER PUBLICATIONS

Extended European Search Report dated May 15, 2020, in corresponding European Patent Application No. 19205458.3.

* cited by examiner

FIG. 15

| INDIVIDUAL | DESIGN VARIABLE | RANDOM NUMBER SIGN |
|---|---|---|
| $A_1$ | $X_1$ (A) | + |
| $A_1$ | $X_1$ (B) | - |
| ... | ... | ... |
| $A_1$ | $X_1$ (J) | - |
| $A_2$ | $X_2$ (A) | - |
| $A_2$ | $X_2$ (B) | + |
| ... | ... | ... |
| $A_2$ | $X_2$ (J) | - |
| ... | ... | ... |
| $A_N$ | $X_N$ (A) | + |
| $A_N$ | $X_N$ (B) | + |
| ... | ... | ... |
| $A_N$ | $X_N$ (J) | - |

FIG. 16

| DESIGN VARIABLE | RANDOM NUMBER SIGN |
|---|---|
| $X_1$ (A) | + |
| $X_2$ (A) | - |
| ... | ... |
| $X_N$ (A) | + |
| $X_1$ (B) | - |
| $X_2$ (B) | + |
| ... | ... |
| $X_N$ (B) | + |
| ... | ... |
| $X_1$ (J) | - |
| $X_2$ (J) | - |
| ... | ... |
| $X_N$ (J) | - |

FIG. 17

| DESIGN VARIABLE | RANDOM NUMBER SIGN | RESULT |
|---|---|---|
| $X_1$ (A) | + | ○ |
| $X_2$ (A) | − | × |
| ... | ... | ... |
| $X_N$ (A) | + | ○ |
| $X_1$ (B) | − | ○ |
| $X_2$ (B) | + | × |
| ... | ... | ... |
| $X_N$ (B) | + | ○ |
| ... | ... | ... |
| $X_1$ (J) | − | ○ |
| $X_2$ (J) | − | × |
| ... | ... | ... |
| $X_N$ (J) | − | ○ |

FIG. 18
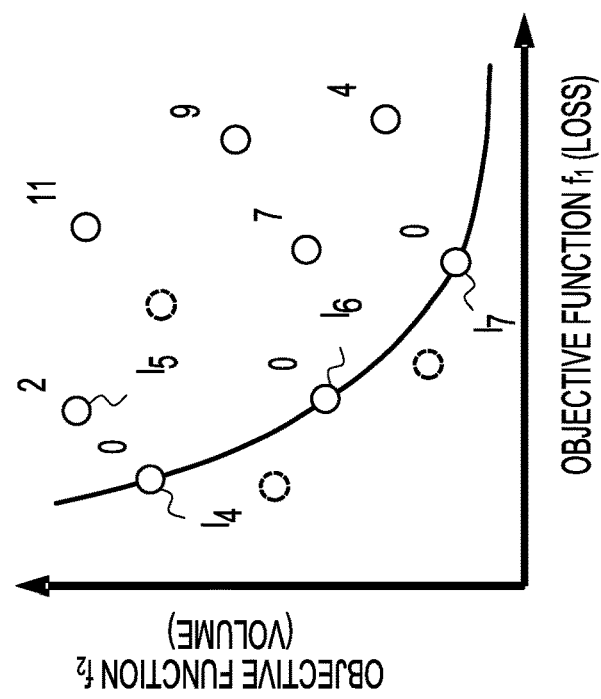
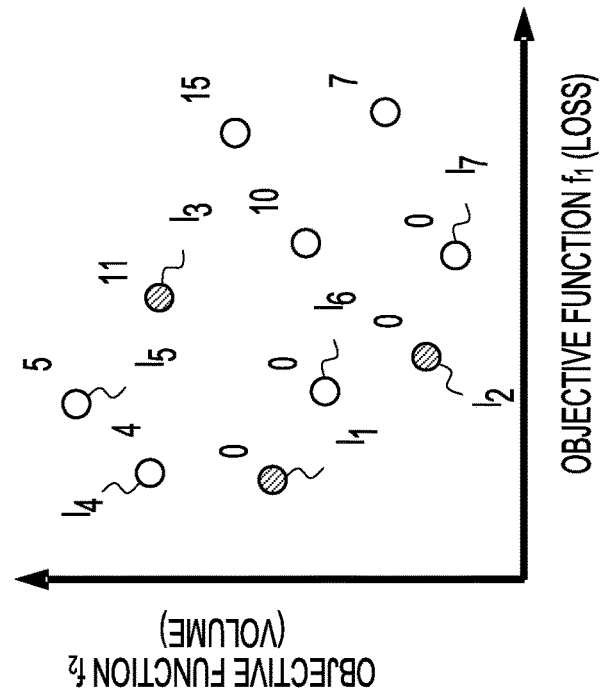

FIG. 19

| DESIGN VARIABLE | RANDOM NUMBER SIGN | RESULT | POSITIVE VALUE NUMBER | NEGATIVE VALUE NUMBER |
|---|---|---|---|---|
| $X_1$ (A) | + | ○ | | |
| $X_2$ (A) | − | × | | |
| ... | ... | ... | $P_A$ | $Q_A$ |
| $X_N$ (A) | + | ○ | | |
| $X_1$ (B) | − | ○ | | |
| $X_2$ (B) | + | × | | |
| ... | ... | ... | $P_B$ | $Q_B$ |
| $X_N$ (B) | + | ○ | | |
| ... | ... | ... | ... | ... |
| $X_1$ (J) | − | ○ | | |
| $X_2$ (J) | − | × | | |
| ... | ... | ... | $P_J$ | $Q_J$ |
| $X_N$ (J) | − | ○ | | |

OPTIMIZATION CALCULATION METHOD AND INFORMATION PROCESSING APPARATUS

CROSS-REFERENCE TO RELATED APPLICATION

This application is based upon and claims the benefit of the prior Japanese Patent Application No. 2018-243292, filed on Dec. 26, 2018, the entire contents of which are incorporated herein by reference.

FIELD

The embodiments discussed herein are related to an optimization calculation method and an information processing apparatus.

BACKGROUND

In the related art, there has been proposed an algorithm of finding an optimal solution such as a genetic algorithm while evolving a plurality of solution candidates (hereinafter, also referred to as individuals). In such an algorithm, it is general that a constraint condition is given to each design variable and an objective function is calculated by performing an individual simulation (hereinafter, also referred to as an evaluation) based on the constraint condition.

In the meantime, in a case of a problem in which nonconformity to the constraint condition of each individual is found after the evaluation, the objective function obtained by the evaluation necessarily includes a nonconforming objective function. For this reason, in this case, for example, a designer adopts a method of calculating objective functions by generating and evaluating a large number of child individuals in advance, and extracting those satisfying the constraint condition (constraint condition found after the evaluation) from the calculated objective functions.

Related techniques are disclosed in, for example, Japanese Laid-open Patent Publication No. 11-085720 and Japanese Laid-open Patent Publication No. 2003-248810.

However, when the above method is adopted, a case may occur where the dependence on an initial value becomes larger or a case where excessive number of individuals are evaluated. Further, the above method has many aspects that depend on repetitive work by trial and error and the experience of the designer. Therefore, there may be a case where the designer is not able to adopt the above method from the viewpoint of work efficiency and reproducibility.

SUMMARY

According to an aspect of the embodiments, an optimization calculation method includes: generating, by a computer, individuals of a current generation with an individual selected in a previous generation as a parent individual by using an algorithm that obtains an optimal solution while evolving a plurality of individuals for each generation; evaluating each individual of the current generation by using a predetermined evaluation function; calculating a constraint condition value of the current generation based on a constraint condition value of the previous generation and a constraint condition provisional value which is achieved by more than half of the individuals of the current generation; determining whether a result of the evaluation for each individual of the current generation satisfies the constraint condition value of the current generation; determining a predetermined offset based on an attribute of each individual, which is generated by a mutation generating process of generating a mutation, among individuals having the evaluation results satisfying the constraint condition value of the current generation; and adding the predetermined offset to a random number used to generate each individual of a next generation by the mutation generating process.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 15 is a view for explaining a specific example of sign information 132;

FIG. 16 is a view for explaining a specific example of sign information 132;

FIG. 17 is a view for explaining a specific example of a process of S31;

FIG. 18 is a view for explaining a specific example of a process of S32;

FIG. 19 is a view for explaining a specific example of a process of S34;

DESCRIPTION OF EMBODIMENTS

<Configuration of Information Processing System>

Figure 1:
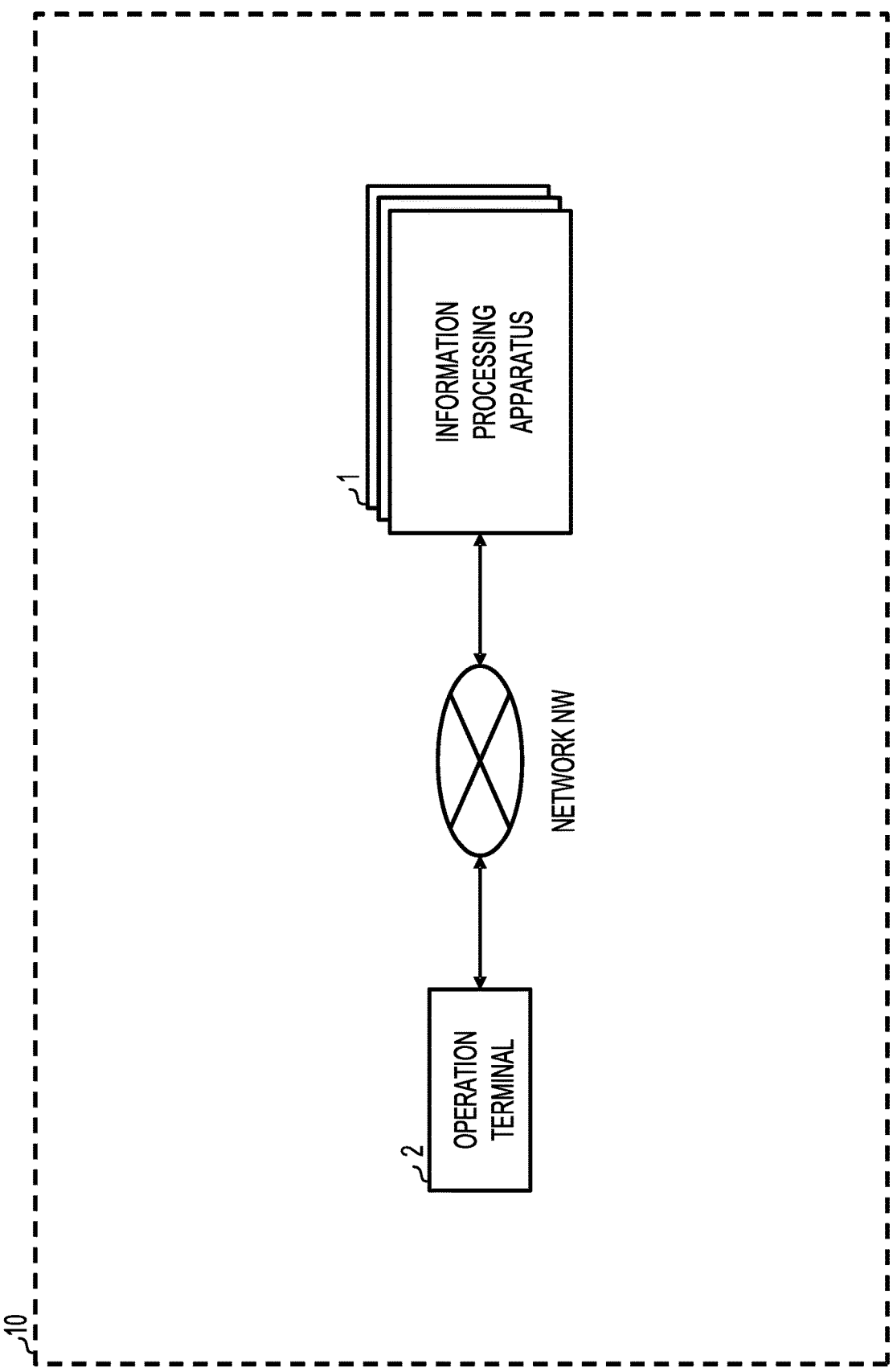
FIG. 1 is a view illustrating the configuration of an information processing system 10.

First, the configuration of an information processing system 10 will be described. FIG. 1 is a view for explaining the configuration of the information processing system 10.

The information processing system 10 illustrated in FIG. 1 includes an information processing apparatus 1 (hereinafter, also referred to as an optimization calculation apparatus 1) and an operation terminal 2. The operation terminal 2 may access the information processing apparatus 1 via a network NW.

The operation terminal 2 is, for example, one or more PCs (Personal Computers) and is a terminal on which a designer operates the information processing apparatus 1.

The information processing apparatus 1 is an apparatus that is composed of, for example, one or more physical machines and performs a process for calculating a solution to a predetermined problem (hereinafter, also referred to as an optimization calculation process) using a genetic algorithm. Specifically, the information processing apparatus 1 acquires, for example, a solution (optimum solution) of a problem, which is found after evaluation of nonconformity to the constraint condition of each individual, by dynamically changing the constraint condition for each generation.

[Specific Examples of Problem]

Next, specific examples of a problem in which a solution is calculated by the optimization calculation process will be described. FIGS. 2 to 6 are views illustrating specific examples of a problem in which a solution is calculated by the optimization calculation process. Specifically, FIGS. 2 to 6 illustrate specific examples of a problem of optimization of the shape of an inductor core that is one of magnetic devices.

Figure 2:
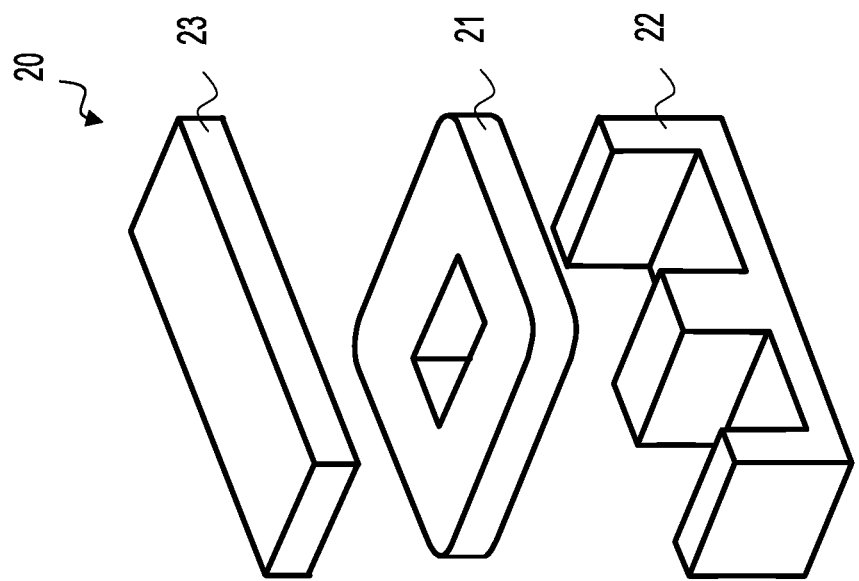
FIG. 2 is a view for explaining a specific example of a problem in which a solution is calculated by an optimization calculation process.
Figure 3:
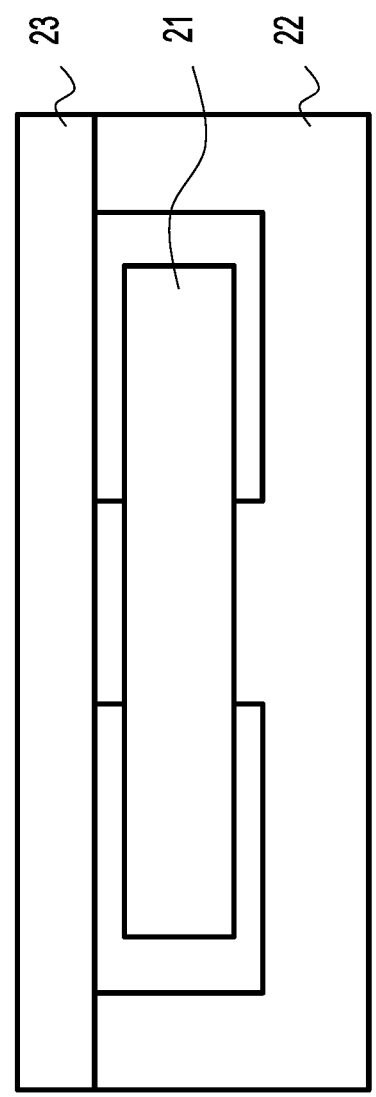
FIG. 3 is a view for explaining a specific example of a problem in which a solution is calculated by an optimization calculation process.
Figure 4:
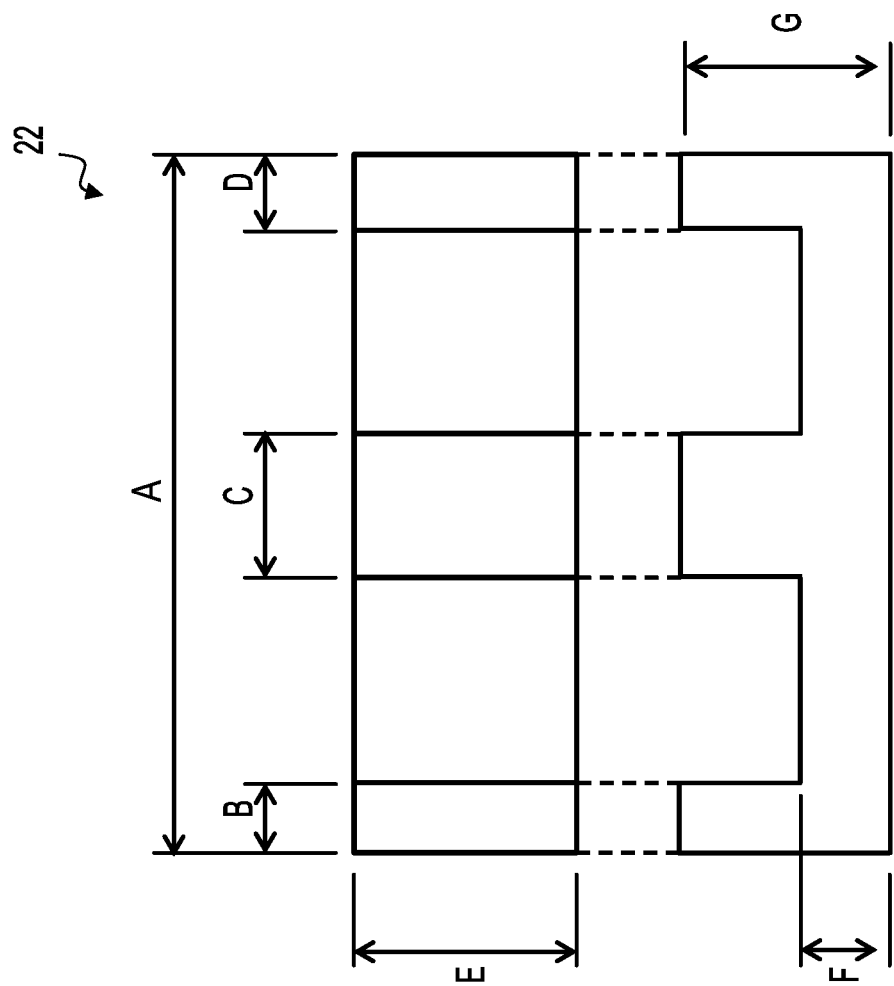
FIG. 4 is a view for explaining a specific example of a problem in which a solution is calculated by an optimization calculation process.
Figure 5:
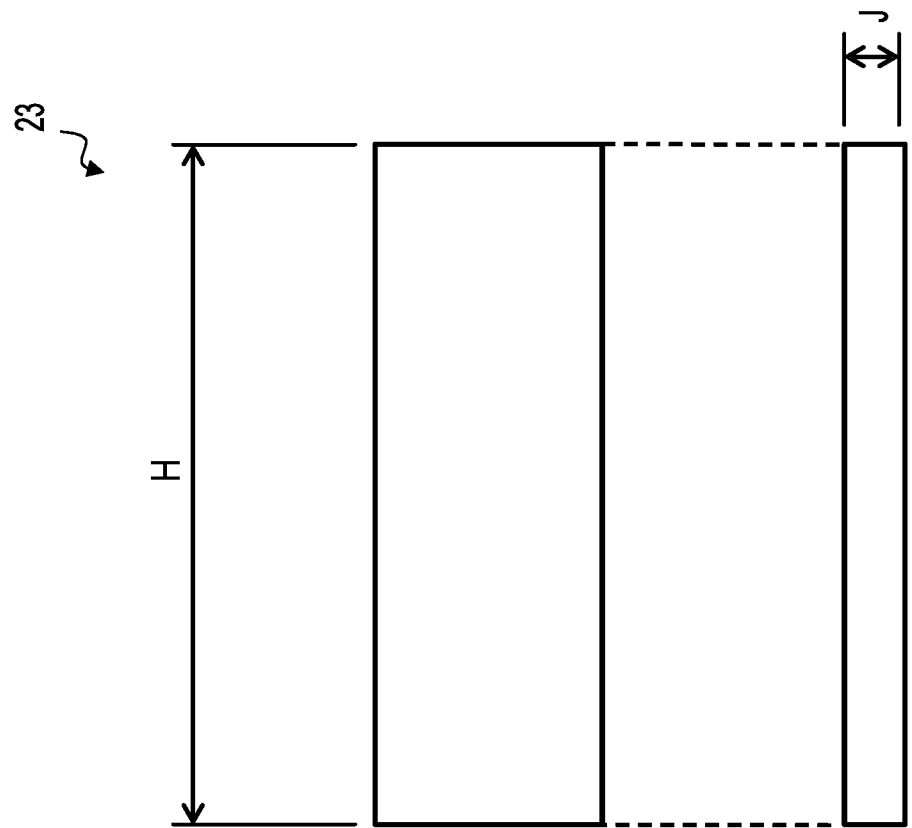
FIG. 5 is a view for explaining a specific example of a problem in which a solution is calculated by an optimization calculation process.

First, an example of an inductor core will be described. FIGS. 2 to 5 are views illustrating an example of an inductor core. Specifically, FIG. 2 is a perspective view of the inductor core, and FIG. 3 is a front view of the inductor core. Further, FIG. 4 is a plan view and a front view of an E-type core illustrated in FIGS. 2 and 3, respectively, and FIG. 5 is a plan view and a front view of an I-type core illustrated in FIGS. 2 and 3, respectively.

As illustrated in FIGS. 2 to 5, the inductor core 20 includes an E-type core 22 and an I-type core 23, which are made of a ferrite-based magnetic material, and a coil 21 wound around a central leg of the E-type core 22. When a current is caused to flow through the coil 21, a magnetic flux is generated to produce an inductance (L value) required for an electrical circuit.

The inductor core 20 is used as a component of a circuit. Therefore, the inductor core 20 is required to satisfy a desired inductance value, to be within a predetermined dimension, and to be as small as possible in loss and volume (weight) inside the magnetic body. For example, the information processing apparatus 1 solves the design optimization problem of the inductor core 20, and finds the minimum values of the loss and volume of the inductor core 20 with the upper and lower limits of the dimensions (A to J illustrated in FIGS. 4 and 5) of the E-type core 22 and the I-type core 23 and the lower limit of the inductance as a constraint condition. Therefore, in this example, each of the loss and the volume is an objective function.

Figure 6:
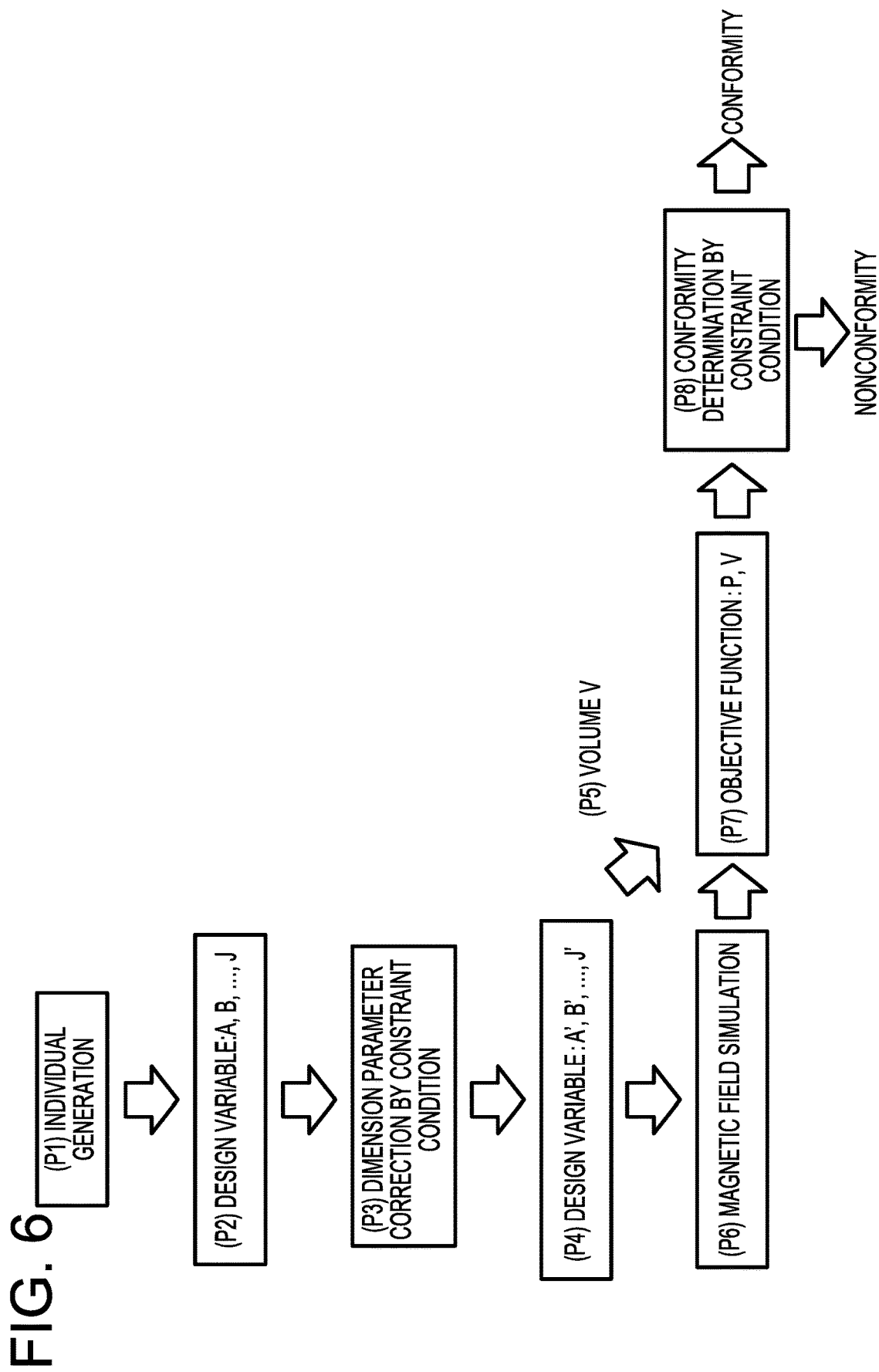
FIG. 6 is a view for explaining a specific example of a problem in which a solution is calculated by an optimization calculation process.

Next, an optimization calculation process (dimension optimization process) of the inductor core will be described. FIG. 6 is a view for explaining the dimension optimization process of the inductor core. Specifically, FIG. 6 is a view illustrating a process performed in the i-th generation. The information processing apparatus 1 performs an optimal design using, for example, a magnetic field simulation based on a three-dimensional model.

As illustrated in FIG. 6, the information processing apparatus 1 generates individuals of the i-th generation (see the sign "(P1)" in FIG. 6), and assigns A to J, which are dimensions of the individuals, as design variables (see the sign "(P2)" in FIG. 6). Then, when the dimension of each individual deviates from a constraint condition, the information processing apparatus 1 corrects a dimension parameter in accordance with the constraint condition by applying a limit with the upper and lower limit values of the dimension (see the sign "(P3)" in FIG. 6). As a result, the design variables are changed to A' to J' (see the sign "(P4)" in FIG. 6). At this point of time, the volume (V), which is one of the objective functions, may be calculated (see the sign "(P5)" in FIG. 6).

Subsequently, the information processing apparatus 1 calculates an inductance (L), which is one of the constraint conditions, and a loss (P) which is an objective function, by performing a magnetic field simulation (see the signs "(P6)" and "(P7)" in FIG. 6).

Thereafter, the information processing apparatus 1 performs an application determination on the loss (P), which is one of the objective functions, based on the inductance (L), which is one of the constraint conditions found by executing the magnetic field simulation (see the sign "(P8)" in FIG. 6). Specifically, the information processing apparatus 1 determines whether the inductance value calculated by the simulation is equal to or larger than a preset constraint condition value $L_i$ for each individual of the i-th generation.

As a result, when determining that the inductance value calculated by the simulation is equal to or larger than the constraint condition value $L_i$, the information processing apparatus 1 determines that the individual is applicable. In the meantime, when determining that the inductance value calculated by the simulation is smaller than the constraint condition value $L_i$, the information processing apparatus 1 determines that the individual is inapplicable.

Here, in the case of the method described with reference to FIGS. 2 to 6, the designer needs to generate and evaluate a large number of child individuals in advance in order to reach the required number of individuals that satisfy the constraint conditions. Therefore, there may be a case where the designer evaluates an excessive number of individuals. In addition, in many aspects, this method relies on repetitive work by trial and error and the experience of the designer. Therefore, the designer may not be able to adopt this method from the viewpoint of work efficiency and reproducibility.

Therefore, the information processing apparatus 1 according to the present embodiment utilizes an algorithm such as a genetic algorithm for obtaining an optimal solution while evolving a plurality of individuals for each generation to generate individuals of the current generation with an individual selected in the previous generation as a parent individual. Then, the information processing apparatus 1 uses a predetermined evaluation function to evaluate each individual of the current generation. Thereafter, a constraint condition value of the current generation is calculated based on a constraint condition value of the previous generation and a constraint condition provisional value which achieves more than half of the individuals of the current generation.

In other words, the genetic algorithm generates individuals of the next generation by generating a population (e.g., a population composed of tens to hundreds of individuals) for each generation and performing a crossover or a mutation among relatively excellent individuals. Therefore, in the genetic algorithm, not all individuals need to satisfy the constraint conditions. However, with the genetic algorithm, unless the generation alternation advances under the condition that at least half of populations satisfies the constraint conditions, it is difficult to achieve both the clearing of the constraint conditions and the minimization of the objective function stochastically. In other words, with the genetic algorithm, when the proportion of nonconformity is large, it is difficult to obtain an optimal solution while satisfying the constraint conditions. Therefore, when a majority of individuals in a certain generation satisfy the constraint conditions and when the mutation is due to a complete random number generation, the information processing apparatus 1 sets the constraint conditions for each generation while dynamically changing the constraint conditions, by using the evolution of populations of the next generation in a way satisfying the constraint conditions stochastically.

Further, the information processing apparatus 1 according to the present embodiment determines whether the evaluation result for each individual of the current generation satisfies the constraint condition value of the current generation, and determines an offset (hereinafter, also referred to as a predetermined offset) based on the characteristic of each individual generated by the mutation (hereinafter, referred to as an incident mutation process) among individuals whose evaluation results satisfy the constraint condition value of the current generation. Then, the information processing apparatus 1 adds the predetermined offset to a random number used to generate each individual of the next generation by mutation.

That is, when child individuals are generated by performing a mutation, the information processing apparatus 1 uses a random number that creates a distribution with a higher probability of satisfying the constraint conditions.

As a result, the information processing apparatus 1 may perform an optimization calculation that is efficient and easily reproducible even for a problem in which nonconformity to the constraint condition of each individual is found after the evaluation.

<Hardware Configuration of Information Processing System>

Figure 7:
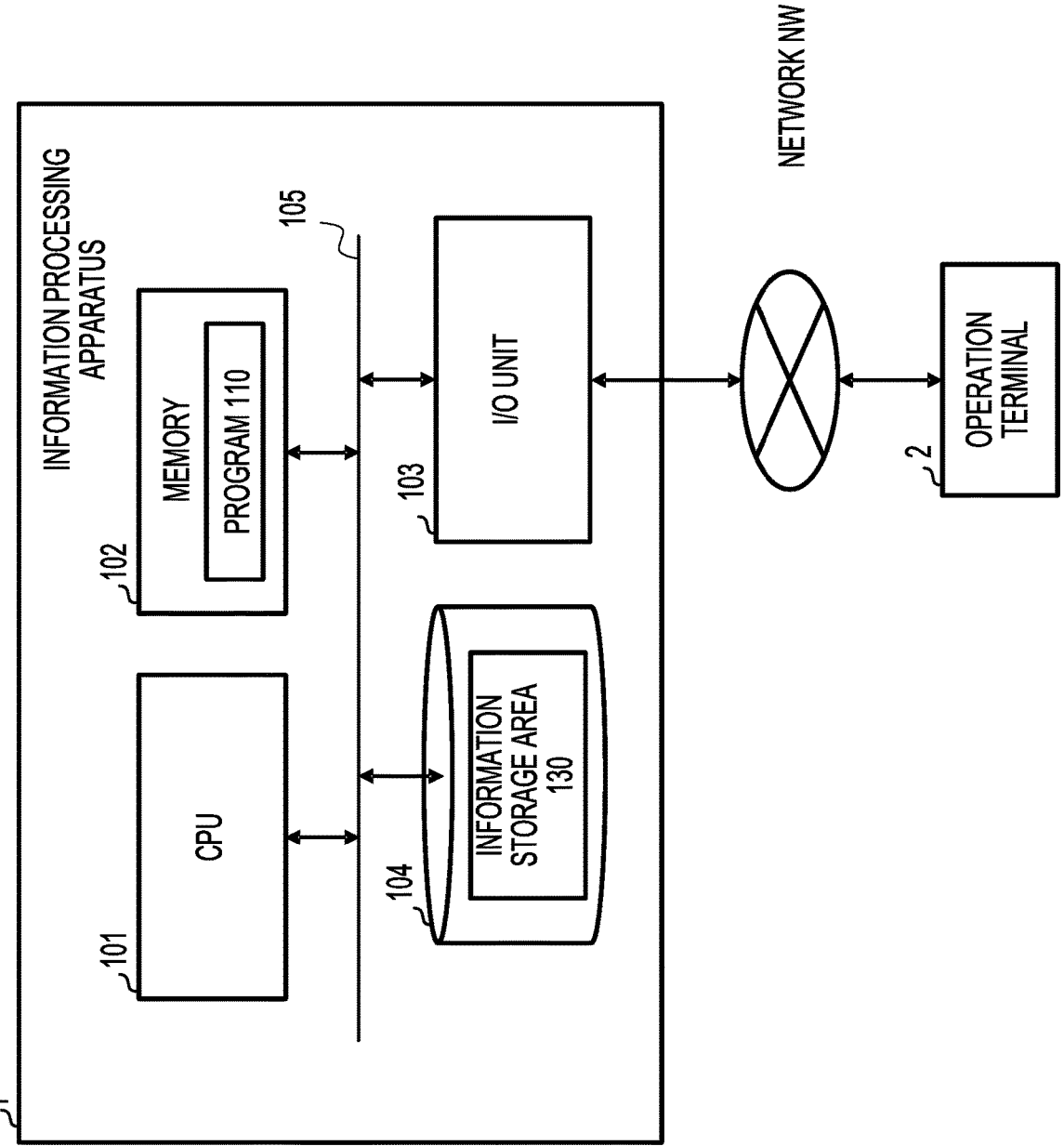
FIG. 7 is a view for explaining a hardware configuration of an information processing apparatus 1.

Next, a hardware configuration of the information processing system 10 will be described. FIG. 7 is a view for explaining a hardware configuration of the information processing apparatus 1.

As illustrated in FIG. 7, the information processing apparatus 1 includes a CPU 101 that is a processor, a memory 102, an external interface (I/O unit) 103, and a storage medium 104, all of which are interconnected via a bus 105.

The storage medium 104 has, for example, a program storage area (not illustrated) that stores a program 110 for performing an optimization calculation process. In addition, the storage medium 104 includes, for example, a storage unit 130 (hereinafter also referred to as an information storage area 130) that stores information to be used to perform the optimization calculation process. Further, the storage medium 104 may be, for example, an HDD (Hard Disk Drive) or an SSD (Solid State Drive).

The CPU 101 performs an optimization calculation process by executing the program 110 loaded from the storage medium 104 into the memory 102.

The external interface 103 communicates with the operation terminal 2 via, for example, the network NW.

<Functions of Information Processing System>

Figure 8:
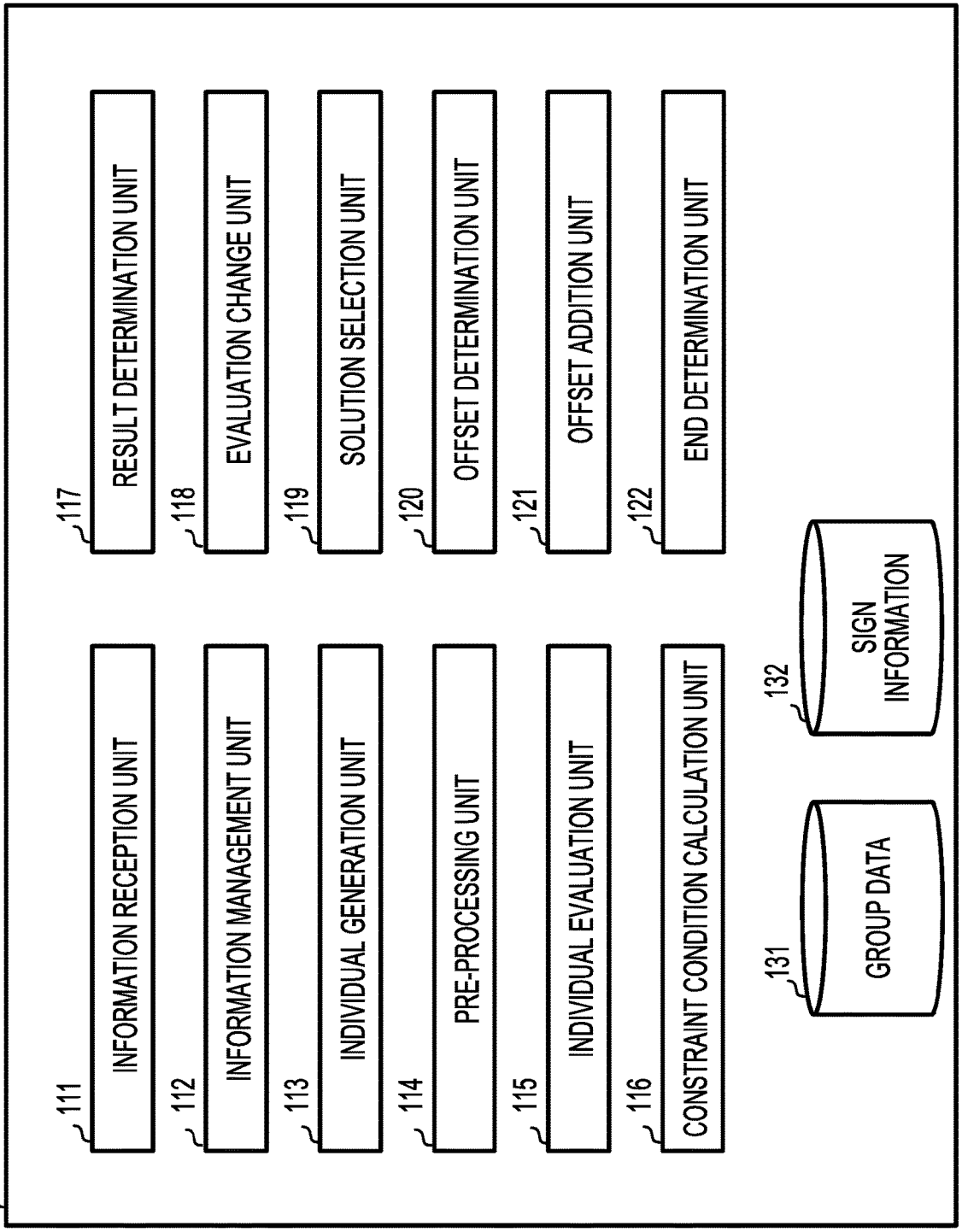
FIG. 8 is a functional block diagram of the information processing apparatus 1.

Next, functions of the information processing system 10 will be described. FIG. 8 is a functional block diagram of the information processing apparatus 1.

As illustrated in FIG. 7, in the information processing apparatus 1, hardware such as, for example, the CPU 101, the memory 102, etc. cooperates organically with the program 110 to implement various functions including an information reception unit 111, an information management unit 112, an individual generation unit 113, a pre-processing unit 114, an individual evaluation unit 115, a constraint condition calculation unit 116, a result determination unit 117, an evaluation change unit 118, a solution selection unit 119, an offset determination unit 120, an offset addition unit 121, and an end determination unit 122.

Further, as illustrated in FIG. 8, the information processing apparatus 1 stores, for example, group data 131 and sign information 132 in the information storage area 130.

The information reception unit 111 receives, for example, an optimization calculation process start instruction input by the designer through the operation terminal 2. In addition, the information reception unit 111 receives, for example, the group data 131 input by the designer through the operation terminal 2. Further, the information reception unit 111 receives, for example, various types of information (such as constraint conditions and parameters used for optimization calculation) input by the designer through the operation terminal 2. Then, the information management unit 112 stores, for example, the group data 131 and various parameters (not illustrated) received by the information reception unit 111 in the information storage area 130.

The individual generation unit 113 utilizes a genetic algorithm to generate individuals of the current generation with an individual selected in the previous generation as a parent individual. That is, the individual generation unit 113 generates new individuals for each generation by genetic manipulation in the genetic algorithm. Further, the genetic manipulation is, for example, a manipulation for performing a crossover or a mutation on relatively good individuals.

Specifically, the individual generation unit 113 randomly selects an individual (initial individual) from the group data 131 stored in the information storage area 130, and performs a genetic manipulation on the selected individual, thereby generating a predetermined number of individuals of the first generation.

In addition, the individual generation unit 113 selects a parent individual as a genetic manipulation target from individuals selected in the previous generation in the second and subsequent generations. The individual generation unit 113 selects a parent individual from individuals selected in the previous generation by, for example, performing a binary tournament selection. The binary tournament is a process of randomly taking a certain number of individuals from the individuals selected in the previous generation and selecting the most applicable individual among the selected individuals as a parent individual. Then, the individual generation unit 113 generates child individuals by performing a crossover or a mutation, which is a genetic manipulation, on the selected parent individual. Thereafter, the information management unit 112 stores information (hereinafter, also referred to as sign information 132) indicating a sign of a random number used to generate a child individual generated by performing a mutation among the child individuals generated by the individual generation unit 113 in the information storage area 130. A specific example of the sign information 132 will be described later.

The pre-processing unit 114 corrects each individual of the current generation (e.g., a design variable of each individual) so as to meet a constraint condition set in advance (hereinafter, also referred to as a pre-constraint condition) among the constraint conditions.

The individual evaluation unit 115 uses a predetermined function to evaluate each individual of the current generation. Specifically, the individual evaluation unit 115 performs a simulation or the like to evaluate the characteristic of each individual of the current generation. The characteristic of each individual is, for example, a characteristic value corresponding to an objective function or a characteristic value corresponding to a constraint condition in the optimization calculation process.

The constraint condition calculation unit 116 sets a constraint condition value of the current generation based on a constraint condition value of the generation immediately previous to the current generation and a constraint condition provisional value which is achieved by more than half of the individuals of the current generation.

In addition, when the current generation is the first generation, the constraint condition calculation unit 116 sets a value smaller than the constraint condition provisional value as a constraint condition value of the first generation. That is, in this case, the constraint condition calculation unit 116 sets a constraint condition value in such a manner that the proportion of individuals that satisfy the constraint condition increases.

The result determination unit 117 determines whether an evaluation result satisfies the constraint condition value of the current generation for each individual of the current generation.

The evaluation change unit 118 performs a change to reduce the evaluation result of an individual that does not satisfy the constraint condition value of the current generation. That is, the evaluation change unit 118 reduces the evaluation result of the individual in order to promote the cull of the individual that the result determination unit 117 determines to not satisfy the constraint condition value of the current generation. Specifically, the evaluation change unit 118 reduces, for example, the ranking or evaluation value of the individual that has been determined not to satisfy the constraint condition. The evaluation change unit 118 may delete an individual that has been determined not to satisfy the constraint condition value.

The solution selection unit 119 selects, for example, individuals that are solution candidates from individuals that have been processed by the result determination unit 117 (including individuals that have been further processed by the evaluation change unit 118). Specifically, the solution selection unit 119 selects, for example, a Pareto solution from an individual that has been processed by the result determination unit 117 and an individual that is a Pareto solution candidate in the generation previous to the current generation, and performs a solution candidate selection by end cut processing or a solution candidate selection by ranking.

The offset determination unit 120 determines a predetermined offset based on the characteristic of each individual generated by the mutation by the individual generation unit 113 among the individuals determined by the result determination unit 117 that the evaluation result satisfies the constraint condition value of the current generation. The characteristic of each individual is, for example, a sign of a random number added to each individual in the mutation. Details of the processing by the offset determination unit 120 will be described later.

The offset addition unit 121 adds a predetermined offset to a random number used to generate each individual of the next generation by mutation. Details of the processing by the offset determination unit 120 will be described later.

The end determination unit 122 determines whether the end condition of the optimization calculation process is satisfied. Specifically, the end determination unit 122 determines whether the current generation that has performed a process has reached the upper limit of the number of generations.

Outline of First Embodiment

Figure 9:
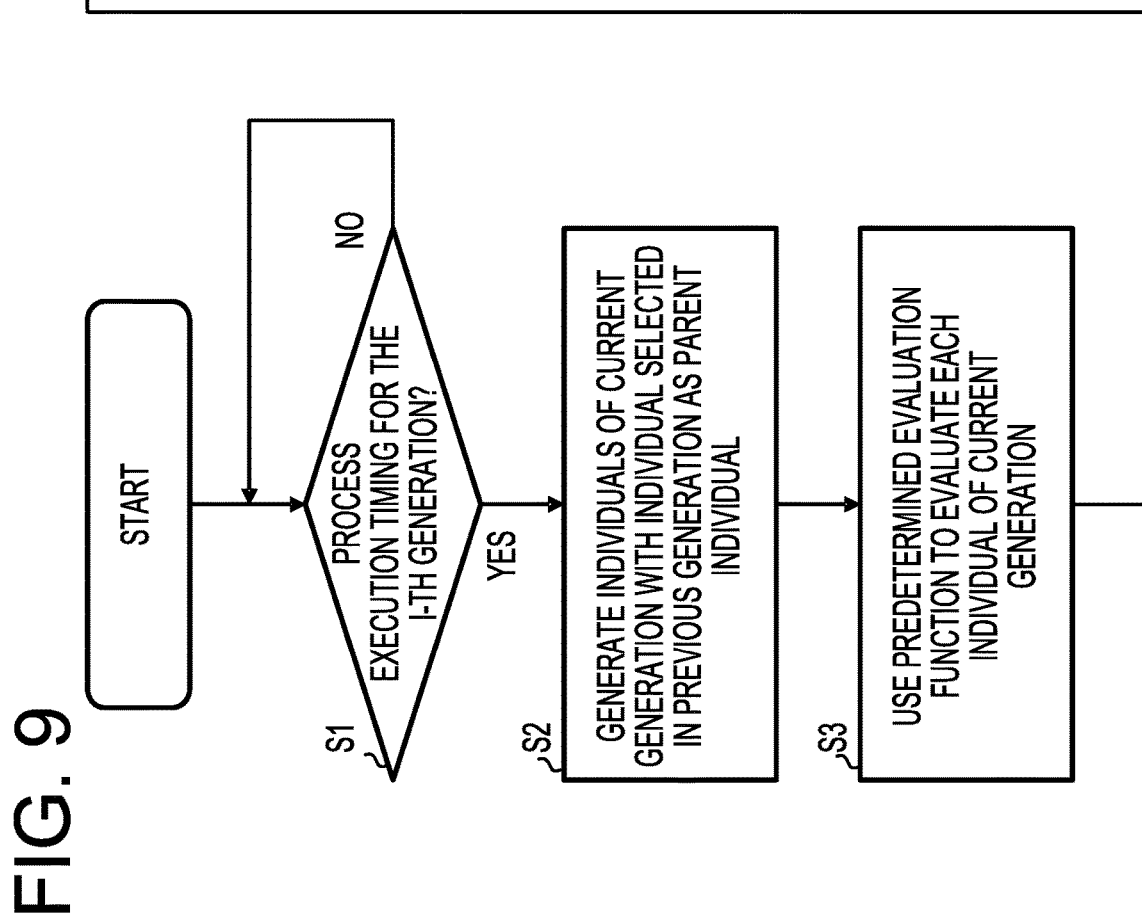
FIG. 9 is a flowchart for explaining an outline of an optimization calculation process according to a first embodiment.

Next, the outline of a first embodiment will be described. FIG. 9 is a flowchart for explaining the outline of an optimization calculation process according to a first embodiment. Specifically, FIG. 9 is a view illustrating a process performed in the i-th generation.

As illustrated in FIG. 9, the information processing apparatus 1 waits until the timing at which the optimization calculation process for the i-th generation is executed reaches ("NO" in S1). Specifically, for example, the information processing apparatus 1 waits until the designer inputs through the operation terminal 2 an instruction to start execution of the optimization calculation process. Further, for example, the information processing apparatus 1 waits until the execution of the optimization calculation process for the (i−1)-th generation is completed.

When the timing at which the optimization calculation process for the i-th generation is executed reaches ("YES" in S1), the information processing apparatus 1 generates individuals of the current generation with an individual selected in the previous generation as a parent individual (S2).

Subsequently, the information processing apparatus 1 uses a predetermined evaluation function to evaluate each individual of the current generation (S3).

Next, the information processing apparatus 1 calculates a constraint condition value of the current generation based on a constraint condition value of the previous generation and a constraint condition provisional value which is achieved by more than half of the individuals of the current generation (S4).

Then, the information processing apparatus 1 determines whether the evaluation result for each individual of the current generation satisfies the constraint condition value of the current generation, and determines a predetermined offset based on the attribute of each individual generated by mutation among the individuals whose evaluation result satisfies the constraint condition value of the current generation (S5).

Thereafter, the information processing apparatus 1 adds a predetermined offset to a random number used to generate each individual of the next generation by mutation (S6).

As a result, the information processing apparatus 1 may perform an optimization calculation that is efficient and easily reproducible even for a problem in which nonconformity to the constraint condition of each individual is found after the evaluation.

Details of First Embodiment

Next, details of the first embodiment will be described. FIGS. 10 to 14 are flowcharts for explaining the details of the optimization calculation process according to the first embodiment. FIGS. 15 to 22 are views for explaining the details of the optimization calculation process according to the first embodiment. In the following description, it is assumed that a variable indicating the generation being processed is "i" and the initial value of "i" is 1.

Figure 10:
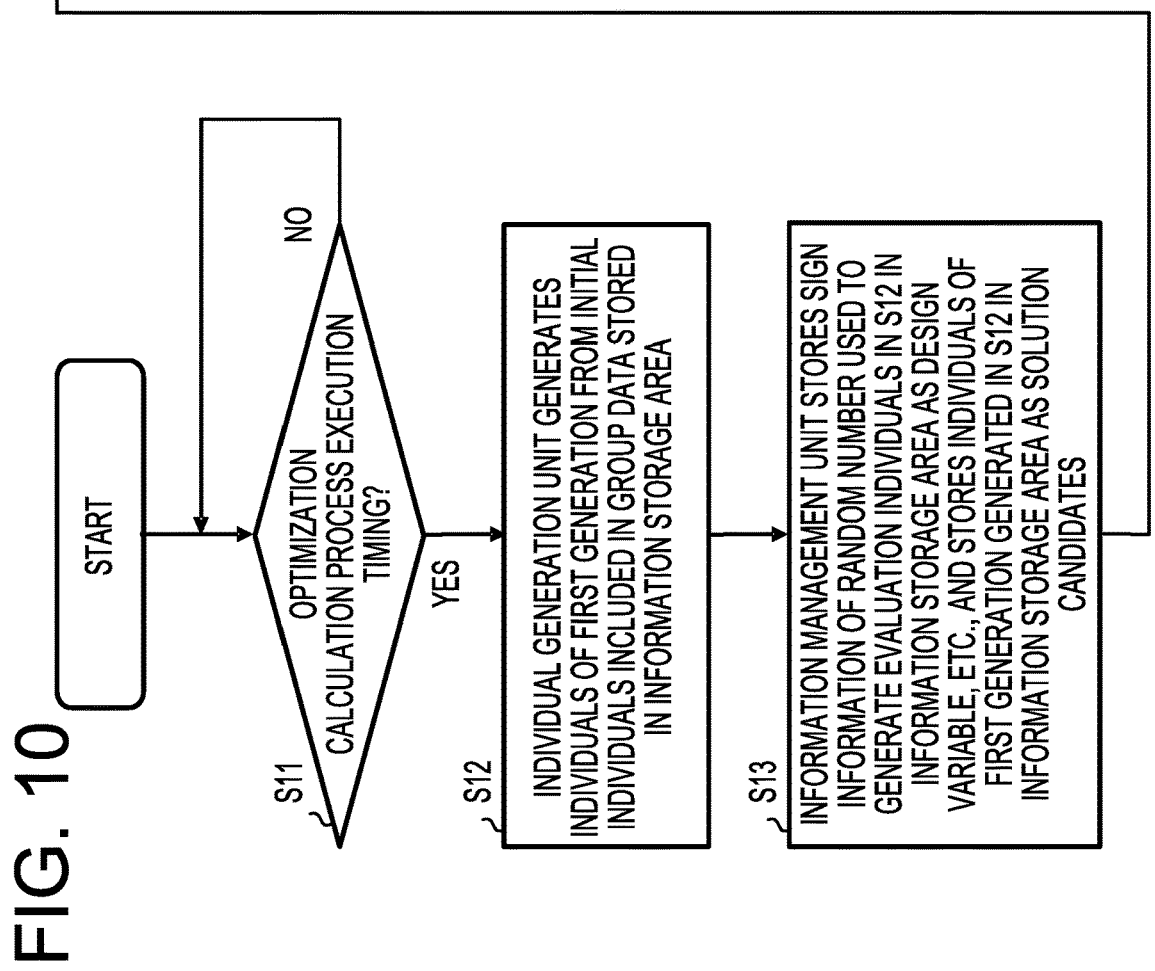
FIG. 10 is a flowchart for explaining details of the optimization calculation process according to the first embodiment.

The information reception unit 111 of the information processing apparatus 1 waits until the optimization calculation processing execution timing reaches, as illustrated in FIG. 10 ("NO" in S11). The optimization calculation process execution timing may be, for example, a timing when the designer inputs through the operation terminal 2 an instruction to start execution of the optimization calculation process.

When the optimization calculation process execution timing reaches ("YES" in S11), the individual generation unit 113 of the information processing apparatus 1 generates an evaluation individual of the first generation from the initial individuals included in the group data 131 stored in the information storage area 130 (S12).

Specifically, the individual generation unit 113 randomly selects an individual from the group data 131 stored in the information storage area 130 and performs a genetic manipulation on the selected individual, thereby generating a predetermined number of individuals of the first generation. More specifically, for example, the individual generation unit 113 performs a genetic manipulation on one individual selected from the group data 131 to generate 100 individuals of the first generation. Here, the random number generation is centered on 0 and is executed so that the number of positive values is stochastically equal to the number of negative values.

Thereafter, the information management unit 112 sorts, for each design variable, the sign information 132 of the random number used to generate individuals of the first generation in the process of S12 and stores the information in the information storage area 130 (S13).

Specifically, the information management unit 112 specifies an individual generated by performing a mutation among the individuals of the first generation generated in the process of S12. Then, the information management unit 112 stores the sign information 132 of the random number used to generate the specified individual in the information storage area 130.

Further, the information management unit 112 stores the individuals of the first generation generated in the process of S12 in the information storage area 130 as solution candidates (not illustrated) (S13). Hereinafter, a specific example of the sign information 132 will be described.

<Specific Examples of Sign Information>

FIGS. 15 and 16 are views for explaining a specific example of the sign information 132. Specifically, FIG. 15 is a view for explaining a specific example of the sign information 132 before being sorted for each design variable (the sign information 132 in a state of being aggregated for each individual). FIG. 16 is a view for explaining a specific example of the sign information 132 after being sorted for each design variable (the sign information 132 in a state of being stored in the information storage area 130 in the process of S13).

First, a specific example of the sign information 132 before being sorted for each design variable will be described.

The sign information 132 illustrated in FIG. 15 has, as items, an "individual" in which information for identifying each individual is stored, a "design variable" in which information for identifying a design variable of each individual is stored, and a "random number sign" in which a random number corresponding to each design variable is stored.

Specifically, in the sign information 132 illustrated in FIG. 15, for example, "+" is stored as the "random number sign" in information (information on the first line) where the "individual" is "$A_1$" and the "design variable is "$X_1(A)$". That is, this information indicates that the sign of the random number given to the design variable A of the individual $A_1$ is positive.

In addition, in the sign information 132 illustrated in FIG. 15, for example, "−" is stored as the "random number sign" in information (information on the second line) where the "individual" is "$A_1$" and the "design variable" is "$X_1(B)$". That is, this information indicates that the sign of the random number given to the design variable B of the individual $A_1$ is negative.

Further, in the sign information 132 illustrated in FIG. 15, for example, "−" is stored as the "random number sign" in information (information on the fifth line) where the "individual" is "$A_2$" and the "design variable" is "$X_2(A)$". That is, this information indicates that the sign of the random number given to the design variable A of the individual $A_2$ is negative. Description of other information included in FIG. 15 is omitted.

Next, a specific example of the sign information 132 after being sorted for each design variable will be described.

The sign information 132 illustrated in FIG. 16 has, as items, a "design variable" in which information for identifying a design variable of each individual is stored, and a "random number sign" in which a random number corresponding to each design variable is stored.

Specifically, in the sign information 132 illustrated in FIG. 16, for example, "+" is stored as the "random number sign" in information (information on the first line) where the "design variable" is "$X_1(A)$". That is, this information indicates that the sign of the random number given to the design variable A of the individual $A_1$ is positive.

In addition, in the sign information 132 illustrated in FIG. 16, for example, "−" is stored as the "random number sign" in information (information on the second line) where the "design variable" is "$X_2(A)$". That is, this information indicates that the sign of the random number given to the design variable A of the individual $A_2$ is negative.

Further, in the sign information 132 illustrated in FIG. 16, for example, "−" is stored as the "random number sign" in information (information on the fifth line) where the "design variable" is "$X_1(B)$". That is, this information indicates that the sign of the random number given to the design variable B of the individual $A_1$ is negative. Description of other information included in FIG. 16 is omitted.

Referring back to FIG. 10, the pre-processing unit 114 of the information processing apparatus 1 performs a pre-processing on individuals of the i-th generation generated in the process of S12 or the process of S54 (to be described later) (S14). Specifically, the pre-processing unit 114 corrects the design variable of each individual of the i-th generation so that the dimension constraint or the like conforms to a preset pre-constraint condition.

Then, the individual evaluation unit 115 of the information processing apparatus 1 performs an evaluation process on the individuals of the i-th generation that has been pre-processed in the process of S14 (S15). Specifically, the individual evaluation unit 115 evaluates the characteristic of each individual of the i-th generation by performing, for example, a simulation.

Subsequently, the constraint condition calculation unit 116 of the information processing apparatus 1 specifies a constraint condition provisional value $L_i'$ which is achieved by more than half of the individuals of the i-th generation subjected to the evaluation process in the process of S15 (S16).

Figure 11:
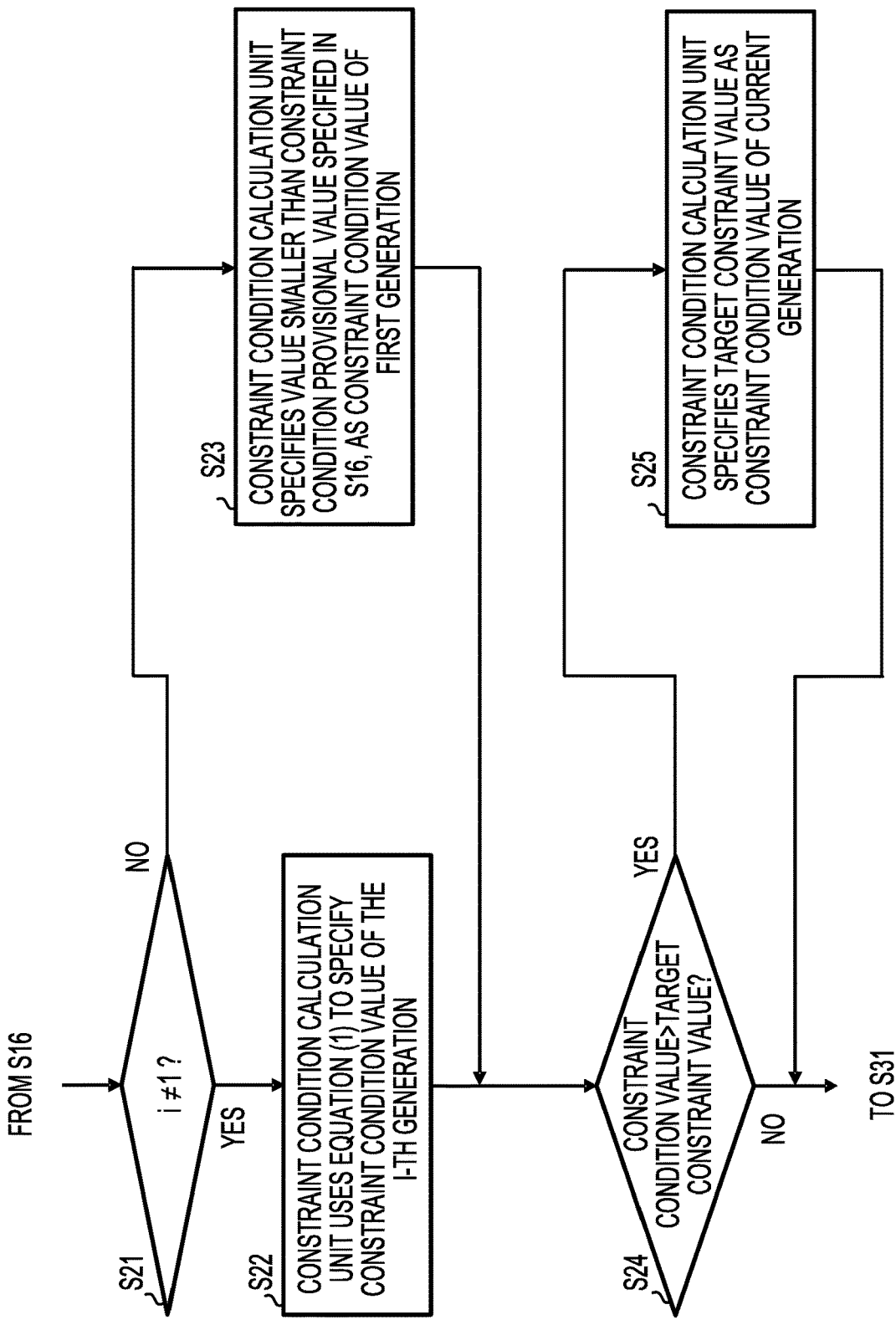
FIG. 11 is a flowchart for explaining details of the optimization calculation process according to the first embodiment.

Next, as illustrated in FIG. 11, the constraint condition calculation unit 116 determines whether a process being executed in the optimization calculation process is a process for the first generation (S21).

As a result, when it is determined that a process being executed in the optimization calculation process is not a process for the first generation ("YES" in S21), the constraint condition calculation unit 116 uses the following equation (1) to specify the constraint condition value $L_i$ of the i-th generation (S22).

$$L_i = (1-K) \times L_{i-1} + K \times L_i' \qquad \text{(Equation 1)}$$

In the above equation (1), the "$L_i$" represents a constraint condition value of the current generation (the i-th generation), and the "$L_{i-1}$" represents a constraint condition value of the previous generation (the (i−1)-th generation), the "$L_i'$" represents a constraint condition provisional value which is achieved by more than half of the individuals of the current generation (the i-th generation), and the "K" represents an arbitrary coefficient (0<K≤1) related to the progress of evolution.

That is, the constraint condition calculation unit 116 dynamically changes the constraint condition for each generation by using a value which is achieved by more than half of individuals used to generate individuals of the next generation.

Here, when more than half of the individuals conform to the constraint condition, the individuals of the next generation evolve in a way to satisfy the constraint condition stochastically. Therefore, the constraint condition calculation unit 116 takes a trade-off with the calculation amount. For example, a value which is achieved by 60% or more of the individuals of the current generation or a value which is achieved by 70% or more of the individuals of the current generation may be used as the constraint condition provisional value $L_i'$.

Further, the coefficient "K" may be determined based on, for example, a relationship between the resource of the information processing apparatus 1 and the calculation time. The coefficient "K" may be set to be the same for all generations, or may be updated for each generation.

When the coefficient "K" is relatively large, the evolution of the individuals advances fast. When the coefficient "K" is relatively small, the evolution of the individuals advances relatively slowly. Specifically, for example, when the coefficient K is suppressed to about 0.3, a stable evolution is expected, that is, an evolution is expected to advance in a way to increase the proportion of individuals that satisfy the constraint conditions more. In the meantime, for example, when the coefficient "K" is increased to about 0.7, the evolution is expected to advance relatively quickly, thereby shortening the calculation time.

Referring back to FIG. 11, when it is determined that the process being executed in the optimization calculation process is a process for the first generation ("NO" in S21), the constraint condition calculation unit 116 specifies a value smaller than the constraint condition provisional value $L_i'$ specified in the process of S16, as the constraint condition value $L_i$ of the first generation (S23).

Subsequently, the constraint condition calculation unit 116 determines whether the constraint condition value $L_i$ of the i-th generation specified in the process of S22 or S23 is larger than a final target constraint condition value $L_{tgt}$ (hereinafter, also referred to as a target constraint value $L_{tgt}$) (S24).

As a result, when it is determined that the constraint condition value $L_i$ of the i-th generation is larger than the target constraint value $L_{tgt}$ ("YES" in S24), the constraint condition calculation unit 116 specifies the target constraint value $L_{tgt}$ as the constraint condition value $L_i$ of the i-th generation (S25).

Figure 12:
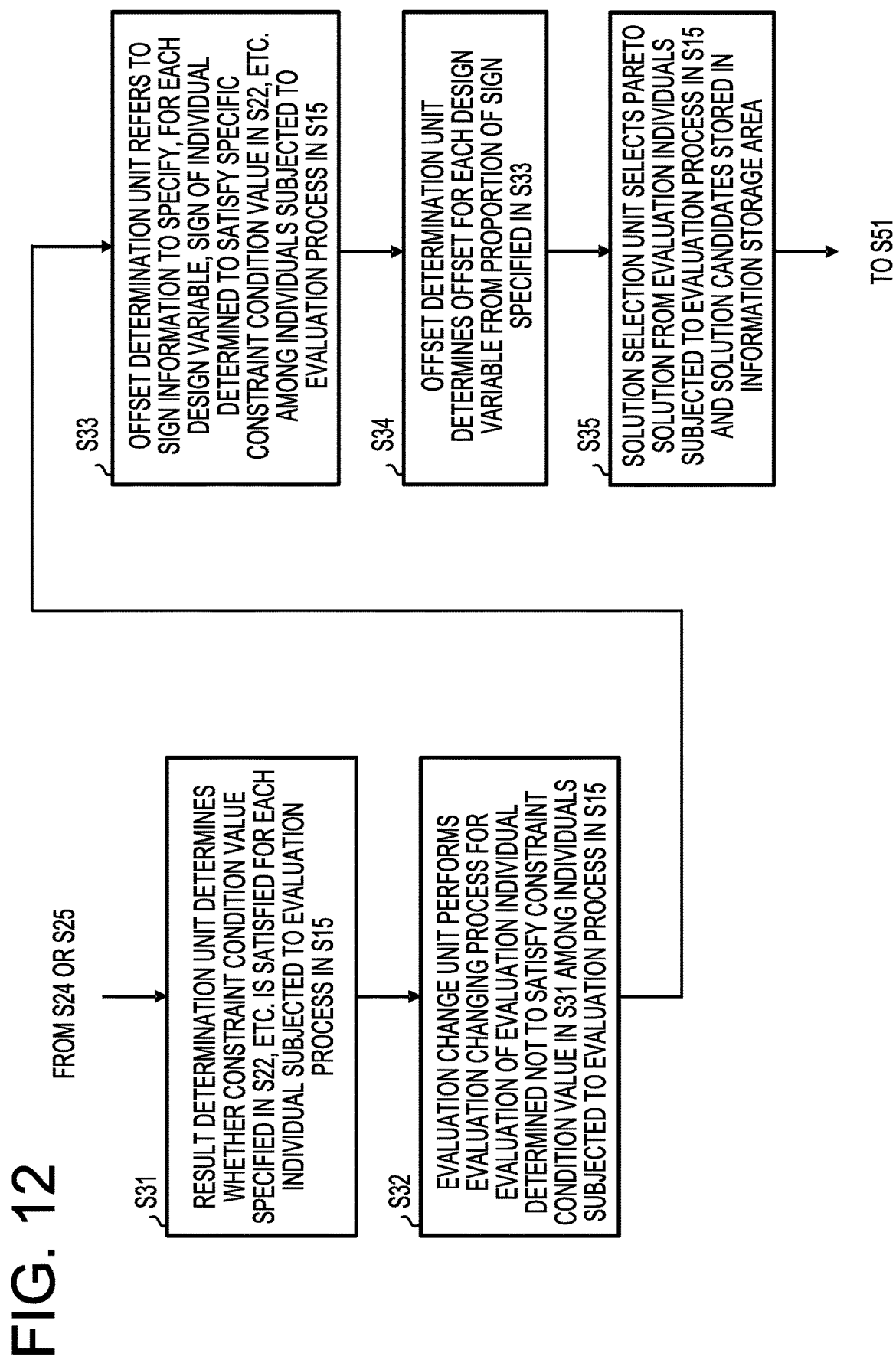
FIG. 12 is a flowchart for explaining details of the optimization calculation process according to the first embodiment.

In the meantime, when it is determined that the constraint condition value $L_i$ of the i-th generation is not larger than the target constraint value $L_{tgt}$ ("NO" in S24), or after the process of S25, the result determination unit 117 of the information processing apparatus 1 determines whether the constraint condition value $L_i$ specified in the process of S22 or the like is satisfied for each individual of the i-th generation subjected to the evaluation process in the process of S15, as illustrated in FIG. 12 (S31). A specific example of the process of S31 will be described below.

<Specific Example of Process of S31>

FIG. 17 is a view for explaining a specific example of the process of S31. The example illustrated in FIG. 17 illustrates information in which "result", which is an item in which information indicating the result of the process of S31 is stored, is added to the sign information 132 illustrated in FIG. 16. The "O" indicating that an individual satisfies the constraint condition value $L_i$ or the "X" indicating that an individual does not satisfy the constraint condition value $L_i$ is set in the item "result".

Specifically, in the example illustrated in FIG. 17, the "X" is stored as "result" in information (information on the second line) where "$X_2(A)$" is stored in "design variable" and information (information on the sixth line) where "$X_2(B)$" is stored in "design variable". That is, the example illustrated in FIG. 17 represents that the individual $A_2$ among the individuals of the i-th generation is an individual that does not satisfy the constraint condition.

Referring back to FIG. 12, the evaluation change unit 118 of the information processing apparatus 1 performs an evaluation changing process for evaluation of the individual determined not to satisfy the constraint condition value $L_i$ in the process of S31 among the individuals of the i-th generation subjected to the evaluation process in the process of S15 (S32).

Specifically, the evaluation change unit 118 performs a change to reduce the evaluation result of the individual which has been determined not to satisfy the constraint condition value $L_i$ in the process of S31. A specific example of the process of S32 will be described below.

<Specific Example of Process of S32>

FIG. 18 is a view for explaining a specific example of the process of S32. Hereinafter, a case where SPEA2 (Strength Pareto Evolutionary Algorithm-2) is used as a bi-objective optimization algorithm will be described. In a multi-objective optimization algorithm, a conformity determination is generally performed by giving a ranking to a solution. In this case, as the number becomes smaller, the rank becomes higher, and 0 is the Pareto optimal solution.

A graph on the left side of FIG. 18 is a diagram for explaining the results when individuals are plotted by taking objective functions as the x-axis (loss) and the y-axis (volume) immediately after a magnetic field simulation. In the example illustrated in the graph on the left side of FIG. 18, shaded plots indicate individuals determined not to satisfy the constraint condition value $L_i$ in the process of S31, and white plots indicate individuals determined to satisfy the constraint condition value $L_i$ in the process of S31. Further, in the example illustrated in the graph on the left side of FIG. 18, a number indicating the ranking of evaluation values is written on the right shoulder of each plot.

As illustrated in the graph on the left side of FIG. 18, in SPEA2, individuals (e.g., individuals $I_1$ and $I_2$) that have no or less other solutions in the lower left have a higher evaluation and a smaller index called ranking. However, for example, the individuals $I_1$ and $I_2$ have a relatively high ranking even when the individuals do not satisfy the constraint condition value $L_i$. In the meantime, for example, an individual $I_4$ has a low evaluation even when the individual satisfies the constraint condition value $L_i$.

Therefore, as illustrated in the graph on the right side of FIG. 18, for example, the evaluation change unit 118 excludes individuals that do not satisfy the constraint condition. Specifically, the information processing apparatus 1 gives rankings to the remaining individuals after excluding individuals that are below the constraint condition value $L_i$. Specifically, as illustrated in the graph on the right side of FIG. 18, the evaluation change unit 118 excludes individuals $I_1$, $I_2$, and $I_3$ whose inductance is smaller than the constraint condition value $L_i$. As a result, in the example illustrated in the graph on the right side of FIG. 18, individuals $I_4$, $I_6$, and $I_7$ whose inductance is equal to or greater than the constraint condition value $L_i$ are Pareto optimal solutions.

As described above, the evaluation change unit 118 intentionally gives a large (bad) evaluation to individuals that do not satisfy the constraint condition, thereby facilitating the cull of individuals.

Referring back to FIG. 12, the offset determination unit 120 of the information processing apparatus 1 refers to the sign information 132 stored in the information storage area 130 to specify, for each design variable, the sign of an individual determined to satisfy the specific constraint condition value $L_i$ in the process of S22 or the like among the individuals subjected to the evaluation process in the process of S15 (S33).

Then, the offset determination unit 120 determines an offset for each design variable from the proportion of the sign specified in the process of S33 (S34). A specific example of the process of S34 will be described below.

<Specific Example of Process in S34>

FIG. 19 is a view for explaining a specific example of the process of S34. The example illustrated in FIG. 19 illustrates information where "positive value number" in which the number of design variables with the positive sign specified in the process of S33, which are design variables of individuals determined to satisfy the constraint condition value $L_i$ in the process of S31, is stored for each design variable, and "negative value number" in which the number of design variables with the negative sign specified in the process of S33, which are design variables of individuals determined to satisfy the constraint condition value $L_i$ in the process of S31, is stored for each design variable, are added to the information illustrated in FIG. 17.

In the following description, it is assumed that the number of child individuals generated by mutation is N and the proportion of positive values of random numbers given to design variables A to J, respectively, is $a_{A\text{-}J}$. That is, for example, it is assumed that the number of positive value random numbers given to the design variable A is $a_A N$ and the number of negative value random numbers given to the design variable A is $(1-a_A)N$.

Specifically, in the information illustrated in FIG. 19, "$P_A$" and "$Q_A$" are respectively stored in "positive value number" and "negative value number" of information (e.g., $X_1(A)$ or $X_2(A)$) corresponding to the design variable A, which is stored in "design variable".

Further, in the information illustrated in FIG. 19, "$P_B$" and "$Q_B$" are respectively stored in "positive value number" and "negative value number" of information (e.g., $X_1(B)$ or $X_2(B)$) corresponding to the design variable B, which is stored in "design variable". Description of other information included in FIG. 19 is omitted.

Then, in the process of S34, for example, the offset determination unit 120 refers to the information illustrated in FIG. 19 to calculate, for each design variable, the proportion of design variables of individuals which have been determined to satisfy the constraint condition value $L_i$ in the process of S31 among the design variables with the positive sign specified in the process of S33 (hereinafter, also referred to as a first proportion).

Specifically, for example, as illustrated in FIG. 19, when the number stored in the "positive value number" column corresponding to each of the design variables A to J is $P_{A\text{-}J}$, the offset determination unit 120 calculates $P_{A\text{-}J}/a_{A\text{-}J}N$ (hereinafter, also denoted as $S_{A\text{-}J}$) as the first proportion corresponding to each of the design variables A to J.

Further, in the process of S34, for example, the offset determination unit 120 refers to the information illustrated in FIG. 19 to calculate, for each design variable, the proportion of design variables of evaluation individuals which have been determined to satisfy the constraint condition value $L_i$ in the process of S31 among the design variables with the negative sign specified in the process of S33 (hereinafter, also referred to as a second proportion).

Specifically, for example, as illustrated in FIG. 19, when the number stored in the "negative value number" column corresponding to each of the design variables A to J is $Q_{A\text{-}J}$, the offset determination unit 120 calculates $Q_{A\text{-}J}/(1-a_{A\text{-}J})N$ (hereinafter, also denoted as $T_{A\text{-}J}$) as the second proportion corresponding to each of the design variables A to J.

Thereafter, the offset determination unit 120 determines an offset corresponding to a design variable having the first proportion which is larger than the second proportion among offsets $\eta_{A\text{-}J}$ corresponding respectively to the design variables A to J as an offset having a positive offset amount. In addition, the offset determination unit 120 determines an offset corresponding to a design variable having the second proportion which is larger than the first proportion among offsets $\eta_{A\text{-}J}$ corresponding respectively to the design variables A to J as an offset having a negative offset amount.

Specifically, for example, when $S_A$ is larger than $T_A$, the offset determination unit 120 determines the offset $\eta_A$ corresponding to the design variable A as an offset having a positive offset amount. For example, when $S_A$ is smaller than $T_A$, the offset determination unit 120 determines the offset $\eta_A$ corresponding to the design variable A as an offset having a negative offset amount.

Similarly, for example, when $S_B$ is larger than $T_B$, the offset determination unit 120 determines the offset $\eta_B$ corresponding to the design variable B as an offset having a positive offset amount. For example, when $S_B$ is smaller than $T_B$, the offset determination unit 120 determines the offset $\eta_B$ corresponding to the design variable B as an offset having a negative offset amount.

Further, in the process of S34, the offset determination unit 120 may determine the offset amount of the offset $\eta_{A\text{-}J}$ corresponding to each design variable, in accordance with, for example, a difference between the first proportion and the second proportion. A specific example of a method of determining the offset amount of the offset $\eta_{A\text{-}J}$ corresponding to each design variable will be described below.

<Specific Example of Method of Determining Offset Amount>

FIGS. 20A to 20D are views for explaining a specific example of a method of determining the offset amount of the offset $\eta_A$ corresponding to the design variable A.

Figure 20A:
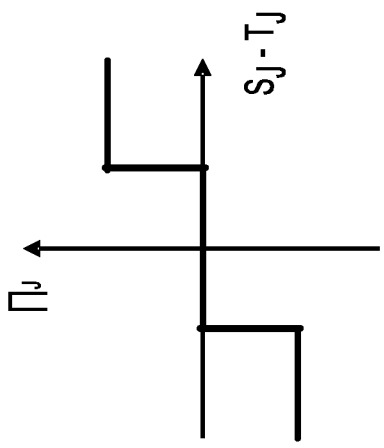
FIGS. 20A to 20D are views for explaining a specific example of a method of determining the offset amount of an offset $\eta_A$ corresponding to a design variable A.

Specifically, for example, as illustrated in FIG. 20A, the offset determination unit 120 may determine the offset amount so that the offset amount of the offset $\eta_A$ is proportional to the difference between $S_A$ and $T_A$.

Figure 20C:
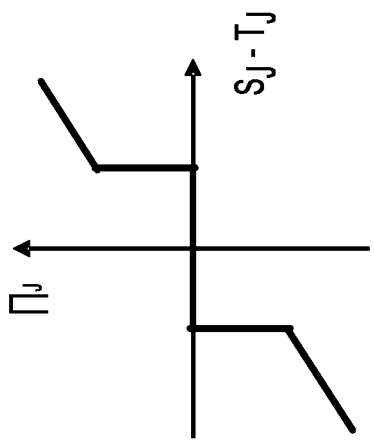
Figure 20B:
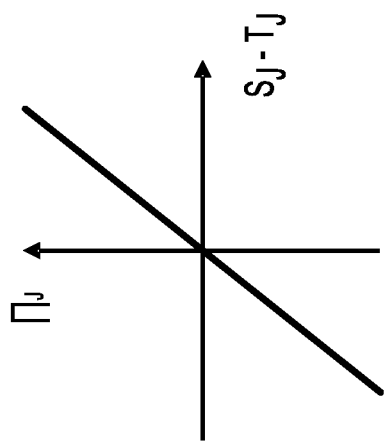

In addition, for example, as illustrated in FIG. 20B, the offset determination unit 120 may set an upper/lower limit for the offset amount of the offset $\eta_A$.

Figure 20D:
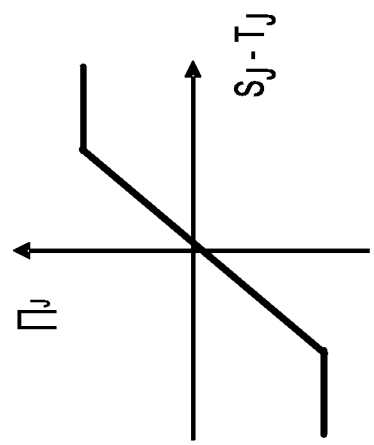

Further, for example, as illustrated in FIGS. 20C and 20D, the offset determination unit 120 may set the offset amount of the offset $\eta_A$ to 0 (i.e., a dead zone) until the absolute value of the difference between $S_A$ and $T_A$ exceeds a predetermined value.

Referring back to FIG. 12, the solution selection unit 119 of the information processing apparatus 1 selects Pareto solutions from the individuals subjected to the evaluation process in the process of S15 and the solution candidates (individuals as Pareto solution candidates in the previous generation) stored in the information storage area 130 (S35).

Figure 13:
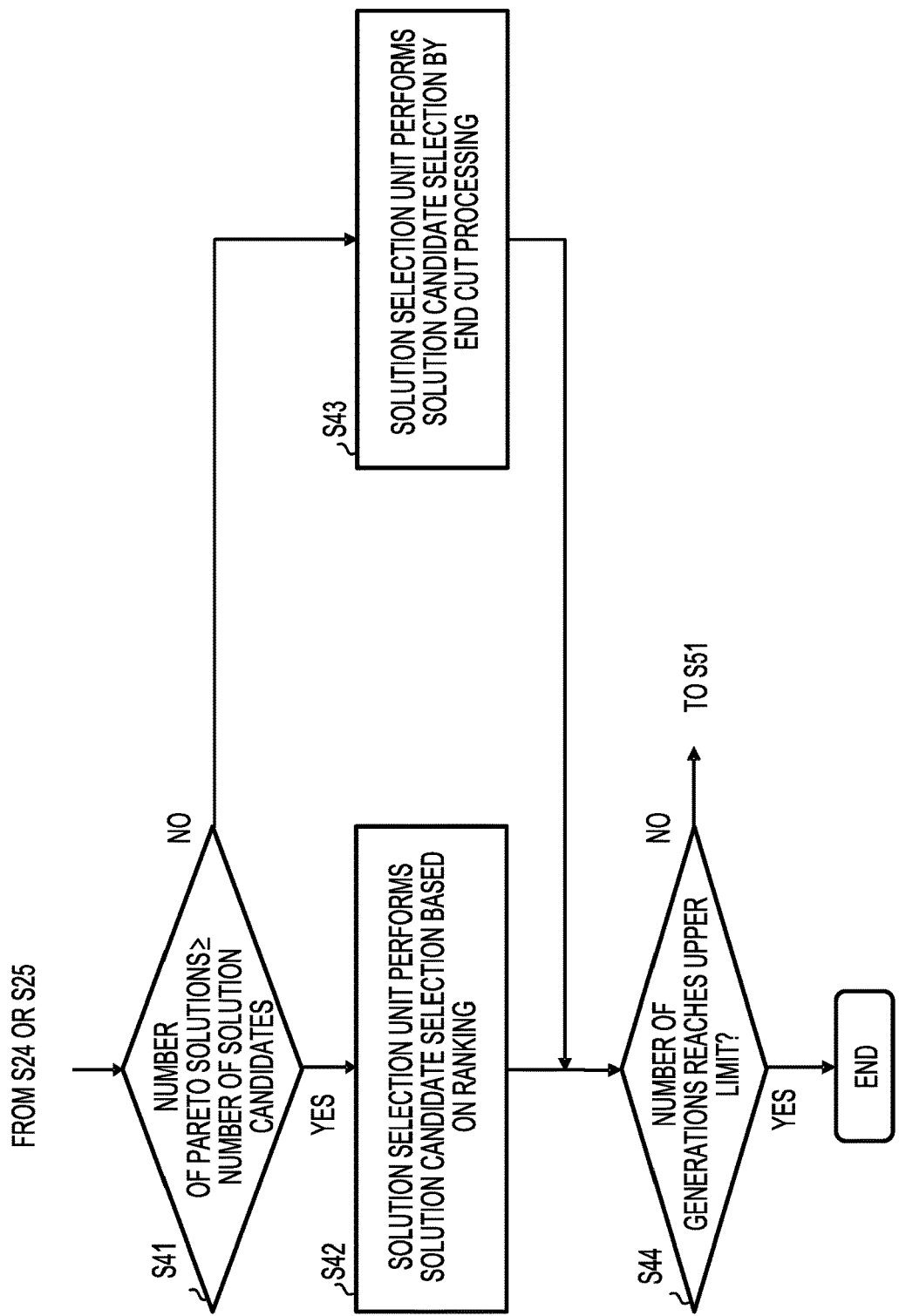
FIG. 13 is a flowchart for explaining details of the optimization calculation process according to the first embodiment.

Then, as illustrated in FIG. 13, the solution selection unit 119 determines whether the number of Pareto solutions selected in the process of S35 is equal to or larger than the predetermined number of solution candidates (hereinafter, also referred to as an archive number) (S41).

As a result, when the number of Pareto solutions selected in the process of S35 is equal to or larger than the number of solution candidates ("YES" in S41), the solution selection unit 119 performs a solution candidate selection based on ranking (S42).

In the meantime, when the number of Pareto solutions selected in the process of S35 is smaller than the number of solution candidates ("NO" in S41), the solution selection unit 119 performs a solution candidate selection by end cut processing (S43).

Thereafter, the end determination unit 122 of the information processing apparatus 1 determines whether the number of generations subjected to an optimization calculation process has reached a predetermined upper limit (S44).

As a result, when it is determined that the number of generations subjected to the optimization calculation process has reached the upper limit ("YES" in S44), the information processing apparatus 1 ends the optimization calculation process. In this case, the information processing apparatus 1 may output a solution candidate selected in the last generation to the operation terminal 2 or the like as an optimal solution.

Figure 14:
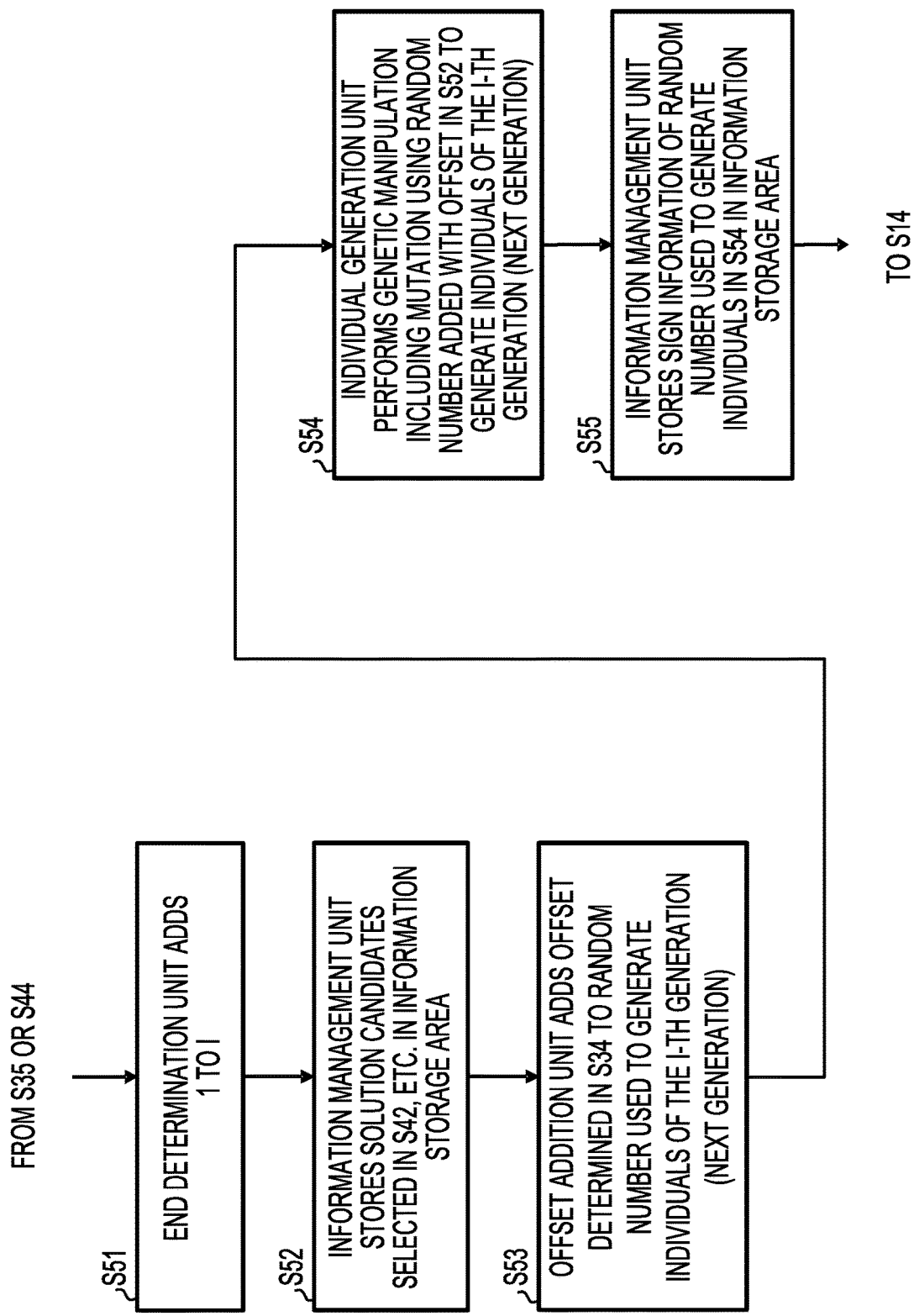
FIG. 14 is a flowchart for explaining details of the optimization calculation process according to the first embodiment.

In the meantime, when it is determined that the number of generations subjected to the optimization calculation process has not reached the upper limit ("NO" in S44), the end determination unit 122 adds 1 to i, as illustrated in FIG. 14 (S51).

Thereafter, the information management unit 112 stores the solution candidates selected in the process of S42 or the like in the information storage area 130 (S52). That is, the information management unit 112 archives the solution candidates selected in the process of S42 or the like.

Then, the offset addition unit 121 of the information processing apparatus 1 adds the offset determined in the process of S34 to the random number used to generate the individuals of the i-th generation (the next generation) (S53). Details of the process of S53 will be described below.

<Details of Process of S53>

Figure 21:
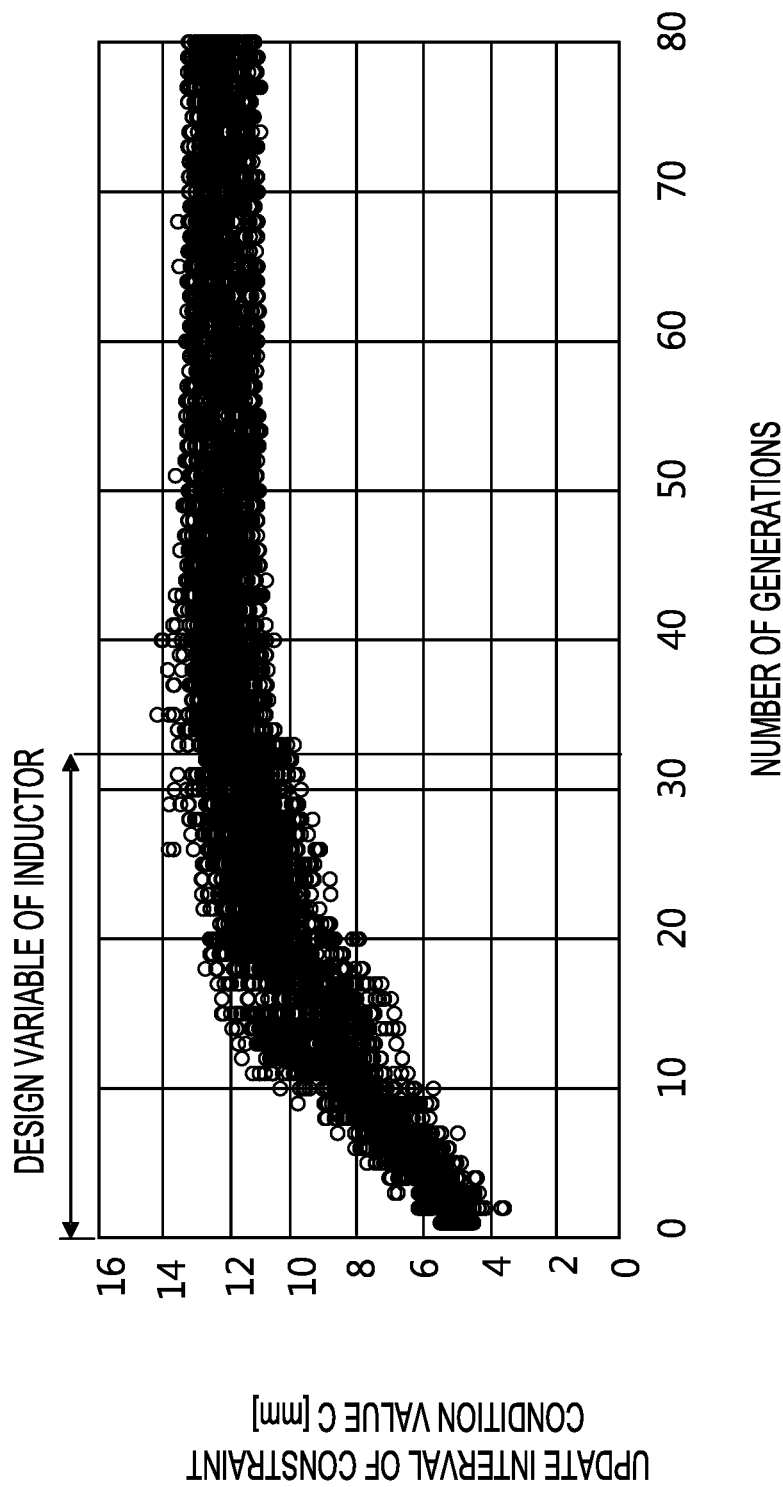
FIG. 21 is a view for explaining details of a process of S53.

FIG. 21 is a view for explaining details of the process of S53. Specifically, FIG. 21 is a plot of the distribution state of a design variable C in the optimization calculation process that requires calculation of the 32nd generation until the target constraint value $L_{tgt}$ reaches. In the example illustrated in FIG. 21, descriptions will be given assuming that the number of individuals in each generation is 100.

As illustrated in FIG. 21, while the constraint condition is being updated (between the first generation and the 32nd generation), the value of the design variable C is changing in a globally increasing way (i.e., in one way). For this reason, the information processing apparatus 1 may use a random number that may be shifted in a way satisfying the constraint condition rather than a uniform random number when performing a mutation on an individual, to determine that the constraint condition may be satisfied with smaller number of generations.

Thus, in the process of S53, the offset addition unit 121 may add the offset determined in the process of S34 to the random number used to generate the individuals of the next generation to generate a random number that may be shifted in a way further satisfying the constraint condition.

Referring back to FIG. 14, the individual generation unit 113 performs a genetic manipulation including a mutation using the random number added with an offset in the process of S52 to generate individuals of the i-th generation (the next generation) (S54).

Specifically, for example, the individual generation unit 113 performs a binary tournament selection to select a parent individual. Then, the individual generation unit 113 performs a crossover or a mutation on the selected parent individual to generate the individuals of the next generation.

Further, the information management unit 112 stores the sign information 132 of the random number used to generate the individuals in the process of S54 in the information storage area 130 (S55). Thereafter, the information processing apparatus 1 performs the processes subsequent to S14 again.

When an update interval of the constraint condition value $L_i$ ends (when the constraint condition value $L_i$ of the i-th generation has reached the target constraint value $L_{tgt}$), the information processing apparatus 1 may stop using the random number added with the offset $\eta_{A\text{-}J}$ and start using a zero-centered uniformly distributed random number. In addition, when the constraint condition value $L_i$ of the i-th generation approaches the target constraint value $L_{tgt}$ to a certain extent, the information processing apparatus may stop using the random number added with the offset $\eta_{A\text{-}J}$ and start using a zero-centered uniformly distributed random number.

<Application Results>

Figure 22:
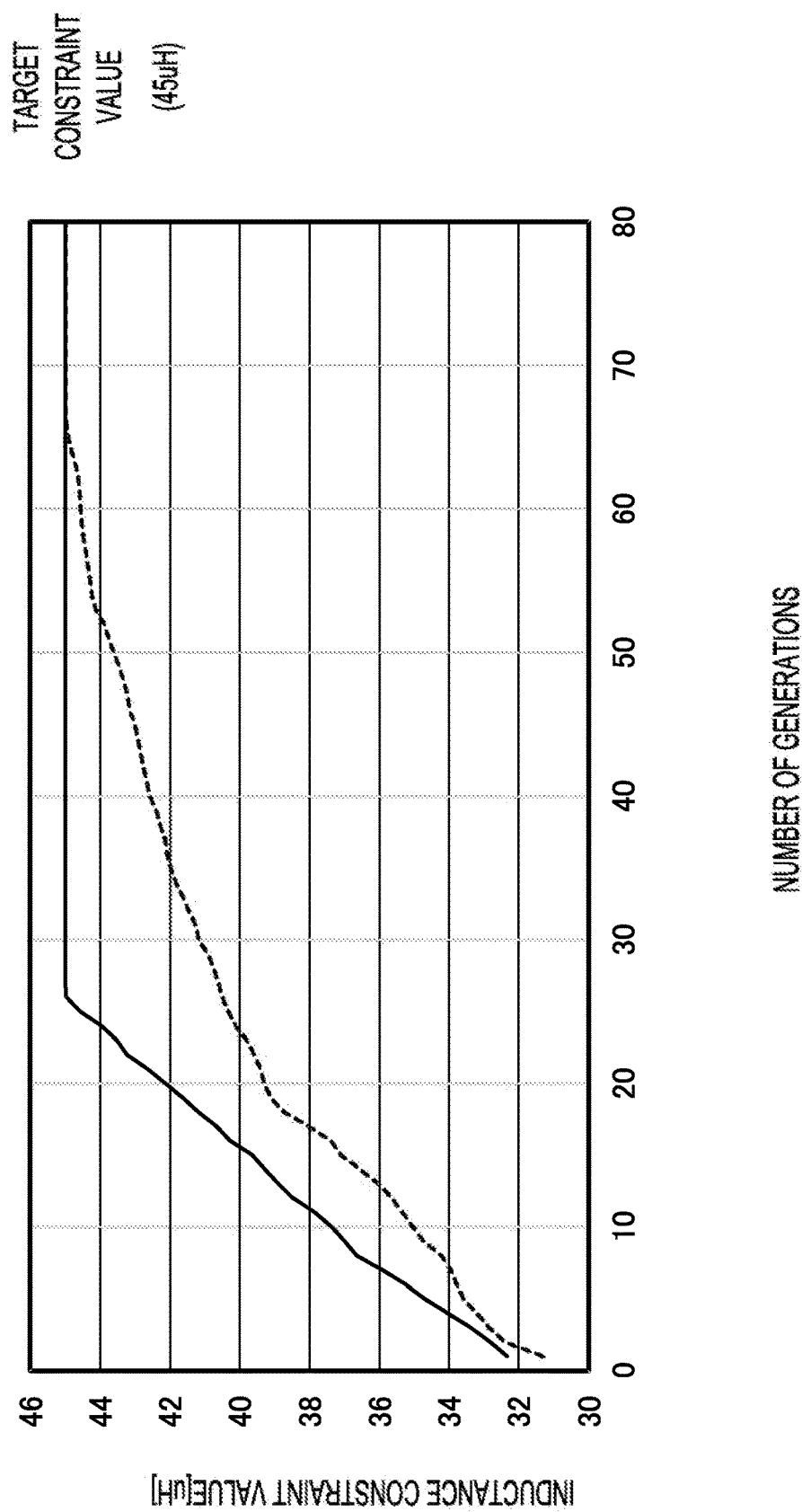
FIG. 22 is a view for explaining results that are obtained when the optimization calculation process according to the present embodiment is applied to optimization of the shape of an inductor core.

Next, descriptions will be made on results when the optimization calculation process according to the present embodiment is applied to the optimization of the shape of an inductor core. FIG. 22 is a view for explaining results when the optimization calculation process according to the present embodiment is applied to the optimization of the shape of an inductor core. Specifically, FIG. 22 is a view for explaining an update profile when the optimization calculation process is performed.

In the example illustrated in FIG. 22, it is assumed that the number of individuals in each generation is 100 and the number of individuals used to generate individuals of the next generation (the archive number) is 50. In the example illustrated in FIG. 22, it is also assumed that the target constraint value $L_{tgt}$ is 45 (µH). In the example illustrated in FIG. 22, a solid line indicates an update profile when the optimization calculation process according to the present embodiment is performed, and a broken line indicates an update profile when an optimization calculation process of the related art (as disclosed in Japanese Laid-Open Patent Publication No. 2014-160399) is performed.

Specifically, the example indicated by the broken line in FIG. 22 illustrates that the optimization calculation process of the related art requires calculation of the 60th generation or more until the constraint condition value $L_i$ reaches the target constraint value $L_{tgt}$. In the meantime, the example indicated by the solid line in FIG. 22 illustrates that the optimization calculation process according to the present embodiment requires only calculation of the 30th generation or less until the constraint condition value $L_i$ reaches the target constraint value $L_{tgt}$.

That is, the example illustrated in FIG. 22 illustrates that the optimization calculation process according to the present embodiment may make the constraint condition value $L_i$ reaching the target constraint value $L_{tgt}$ faster than that of the related art. Therefore, the information processing apparatus 1 may use the optimization calculation process according to the present embodiment to reduce the number of calculations more than conventional.

As described above, the information processing apparatus 1 according to the present embodiment uses an algorithm such as a genetic algorithm of fining an optimal solution while evolving a plurality of individuals for each generation, thereby generating individuals of the current generation with individuals selected in the previous generation as a parent individual. Then, the information processing apparatus 1 uses a predetermined evaluation function to evaluate each individual of the current generation. Thereafter, the information processing apparatus 1 calculates the constraint condition value of the current generation based on the constraint condition value of the previous generation and the constraint condition provisional value which is achieved by more than half of the individuals of the current generation.

Further, the information processing apparatus 1 according to the present embodiment determines whether the evaluation result for each individual of the current generation satisfies the constraint condition value of the current generation, and determines a predetermined offset based on the attribute of each individual generated by mutation among individuals having evaluation results satisfying the constraint condition value of the current generation. Then, the information processing apparatus 1 adds the predetermined offset to a random number used to generate each individual of the next generation by mutation.

As a result, the information processing apparatus 1 may perform an optimization calculation that is efficient and easily reproducible even for a problem in which nonconformity to the constraint condition of each individual is found after the evaluation.

According to an aspect of the embodiments, an efficient and easily reproducible optimization calculation may be implemented.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An optimization calculation method, comprising:
   generating, by a computer, individuals of a current generation with an individual selected in a previous generation as a parent individual by using an algorithm that obtains an optimal solution while generating a plurality of individuals for each generation, each of the plurality of individuals being an element of an electric device and the optimal solution indicating an optimal dimension of the element of the electric device;
   evaluating, by the computer, each individual of the current generation by using a predetermined evaluation function;
   calculating, by the computer, a constraint condition value of the current generation based on a constraint condition value of the previous generation and a constraint condition provisional value which is achieved by more than half of the individuals of the current generation, the constraint condition value indicating an upper limit value and a lower limit value of a dimension of the element of the electric device;
   determining, by the computer, whether a result of the evaluation for each individual of the current generation satisfies the constraint condition value of the current generation;
   determining, by the computer, a predetermined offset based on an attribute of each individual, which is generated by a mutation generating process that generates a mutation of a child individual, among individuals having the evaluation results that satisfies the constraint condition value of the current generation, the attribute of each individual indicating a sign of a random number added to each individual in the mutation generating process; and
   adding, by the computer, the predetermined offset to the random number used to generate each individual of a next generation by the mutation generating process.

2. The optimization calculation method according to claim 1, further comprising:
   storing the sign of the random number corresponding to each individual generated by the mutation generating process among the individuals of the current generation in a memory, and
   determining the predetermined offset by referring to the sign stored in the memory.

3. The optimization calculation method according to claim 2, further comprising:
   calculating a first proportion and a second proportion, the first proportion being a proportion of individuals that satisfies the constraint condition value of the current generation among individuals with a positive sign stored in the memory, the second proportion being a proportion of individuals that satisfies the constraint condition value of the current generation among individuals with a negative sign stored in the memory;
   determining the predetermined offset as an offset having a positive offset amount when the first proportion is larger than the second proportion; and
   determining the predetermined offset as an offset having a negative offset amount when the second proportion is larger than the first proportion.

4. The optimization calculation method according to claim 3, further comprising:
 determining an offset amount of the predetermined offset in accordance with a difference between the first proportion and the second proportion.

5. An information processing apparatus, comprising:
 a memory; and
 a processor coupled to the memory and the processor configured to:
 generate individuals of a current generation with an individual selected in a previous generation as a parent individual by using an algorithm that obtains an optimal solution while generating a plurality of individuals for each generation, each of the plurality of individuals being an element of an electric device and the optimal solution indicating an optimal dimension of the element of the electric device;
 evaluate each individual of the current generation by using a predetermined evaluation function;
 calculate a constraint condition value of the current generation based on a constraint condition value of the previous generation and a constraint condition provisional value which is achieved by more than half of the individuals of the current generation, the constraint condition value indicating an upper limit value and a lower limit value of a dimension of the element of the electric device;
 determine whether a result of the evaluation for each individual of the current generation satisfies the constraint condition value of the current generation;
 determine a predetermined offset based on an attribute of each individual, which is generated by a mutation generating process that generates a mutation of a child individual, among individuals having the evaluation results that satisfies the constraint condition value of the current generation, the attribute of each individual indicating a sign of a random number added to each individual in the mutation generating process; and
 add the predetermined offset to the random number used to generate each individual of a next generation by the mutation generating process.

6. The information processing apparatus according to claim 5, wherein the processor is further configured to:
 store the sign of the random number corresponding to each individual generated by the mutation generating process among the individuals of the current generation in the memory, and
 determine the predetermined offset by referring to the sign stored in the memory.

7. The information processing apparatus according to claim 6, wherein the processor is further configured to:
 calculate a first proportion and a second proportion, the first proportion being a proportion of individuals that satisfies the constraint condition value of the current generation among individuals with a positive sign stored in the memory, the second proportion being a proportion of individuals that satisfies the constraint condition value of the current generation among individuals with a negative sign stored in the memory;
 determine the predetermined offset as an offset having a positive offset amount when the first proportion is larger than the second proportion; and
 determine the predetermined offset as an offset having a negative offset amount when the second proportion is larger than the first proportion.

8. The information processing apparatus according to claim 7, wherein the processor is further configured to:
 determine an offset amount of the predetermined offset in accordance with a difference between the first proportion and the second proportion.

9. A non-transitory recording medium having stored therein a program that causes a computer to perform a process, the process comprising:
 generating individuals of a current generation with an individual selected in a previous generation as a parent individual by using an algorithm that obtains an optimal solution while generating a plurality of individuals for each generation, each of the plurality of individuals being an element of an electric device and the optimal solution indicating an optimal dimension of the element of the electric device;
 evaluating each individual of the current generation by using a predetermined evaluation function;
 calculating a constraint condition value of the current generation based on a constraint condition value of the previous generation and a constraint condition provisional value which is achieved by more than half of the individuals of the current generation, the constraint condition value indicating an upper limit value and a lower limit value of a dimension of the element of the electric device;
 determining whether a result of the evaluation for each individual of the current generation satisfies the constraint condition value of the current generation;
 determining a predetermined offset based on an attribute of each individual, which is generated by a mutation generating process that generates a mutation of a child individual, among individuals having the evaluation results that satisfies the constraint condition value of the current generation, the attribute of each individual indicating a sign of a random number added to each individual in the mutation generating process; and
 adding the predetermined offset to the random number used to generate each individual of a next generation by the mutation generating process.

10. The non-transitory recording medium according to claim 9, the process further comprising:
 storing the sign of the random number corresponding to each individual generated by the mutation generating process among the individuals of the current generation in a memory, and
 determining the predetermined offset by referring to the sign stored in the memory.

11. The non-transitory recording medium according to claim 10, the process further comprising:
 calculating a first proportion and a second proportion, the first proportion being a proportion of individuals that satisfies the constraint condition value of the current generation among individuals with a positive sign stored in the memory, the second proportion being a proportion of individuals that satisfies the constraint condition value of the current generation among individuals with a negative sign stored in the memory;
 determining the predetermined offset as an offset having a positive offset amount when the first proportion is larger than the second proportion; and
 determining the predetermined offset as an offset having a negative offset amount when the second proportion is larger than the first proportion.

12. The non-transitory recording medium according to claim 11, the process further comprising:
    determining an offset amount of the predetermined offset in accordance with a difference between the first proportion and the second proportion.

\* \* \* \* \*